United States Patent
Shibata et al.

(10) Patent No.: US 12,172,071 B2
(45) Date of Patent: Dec. 24, 2024

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Nozomu Shibata, Tokyo (JP); Shinichiro Akihama, Tokyo (JP); Go Kikuchi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 35 days.

(21) Appl. No.: 17/811,191

(22) Filed: Jul. 7, 2022

(65) Prior Publication Data

US 2022/0339535 A1    Oct. 27, 2022

Related U.S. Application Data

(63) Continuation of application No. PCT/JP2021/000298, filed on Jan. 7, 2021.

(30) Foreign Application Priority Data

Jan. 17, 2020 (JP) ................................. 2020-006191

(51) Int. Cl.
*A63F 13/00* (2014.01)
*A63F 13/35* (2014.01)
(Continued)

(52) U.S. Cl.
CPC ............. *A63F 13/35* (2014.09); *A63F 13/69* (2014.09); *A63F 13/795* (2014.09); *A63F 13/847* (2014.09)

(58) Field of Classification Search
CPC ........ A63F 13/79; A63F 13/795; A63F 13/45; A63F 13/847; A63F 13/87
See application file for complete search history.

(56) References Cited

U.S. PATENT DOCUMENTS

2012/0220377 A1* 8/2012 Cantor .................. A63F 13/795
    463/42
2013/0230858 A1* 9/2013 Cantor ................. C12Q 1/6804
    536/25.4

(Continued)

FOREIGN PATENT DOCUMENTS

JP    2018068619 A    5/2018
WO    2016203688 A1   12/2016

OTHER PUBLICATIONS

"Novice's Bonus" FF14 Online Wiki(Way Back Machine) [online] Oct. 27, 2018, Internet [retrieved on Mar. 16, 2021] (5 pages).

(Continued)

*Primary Examiner* — David L Lewis
*Assistant Examiner* — Eric M Thoas
(74) *Attorney, Agent, or Firm* — Osha Bergman Watanabe & Burton LLP

(57) ABSTRACT

A non-transitory computer readable medium stores a program causing a computer to execute: forming a team constituted of a plurality of players who try a specific battle game; determining players who have cleared the specific battle game on the basis of player information of the plurality of players; determining whether or not a reward acquiring condition is satisfied, the reward acquiring condition being satisfied when it is determined that the team includes a first player and a second player, the first player being a player who has cleared the specific battle game, and the second player being a player who has not cleared the specific battle game; and assigning a reward to the first player when it is determined that the reward acquiring condition is satisfied and the specific battle game has been cleared by the team.

7 Claims, 42 Drawing Sheets

(51) Int. Cl.
   *A63F 13/69*   (2014.01)
   *A63F 13/795*  (2014.01)
   *A63F 13/847*  (2014.01)

(56) References Cited

U.S. PATENT DOCUMENTS

2017/0113144 A1* 4/2017 McDonald ............. G06Q 50/00
2018/0185755 A1  7/2018 Takemura et al.
2020/0139241 A1  5/2020 Takemura et al.

OTHER PUBLICATIONS

Office Action issued in Japanese Application No. 2020-006191; Dated Jul. 7, 2020 (4 pages).
Office Action issued in Japanese Application No. 2020-006191; Dated Nov. 4, 2020 (4 pages).
Office Action issued in Japanese Application No. 2020-006191; Dated Mar. 2, 2021 (4 pages).
International Search Report issued in International Application No. PCT/JP2021/000298, mailed Mar. 30, 2021 (7 pages).
Written Opinion issued in International Application No. PCT/JP2021/000298; Dated Mar. 30, 2021 (4 pages).

* cited by examiner

| QUEST | ITEM A | ITEM B | ITEM C | ITEM D | ITEM E | ITEM F | ITEM G | ITEM H |
|---|---|---|---|---|---|---|---|---|
| QUEST1 | 25 | 25 | 25 | 25 | 30 | 30 | 30 | 30 |
| QUEST2 | 50 | 50 | 50 | 50 | 0 | 0 | 0 | 0 |
| QUEST3 | 0 | 0 | 0 | 0 | 50 | 100 | 50 | 50 |

FIG.7A

| QUEST | NUMBER OF CONTINUATIONS | ITEM L | ITEM M | ITEM N | ITEM P | ITEM Q | ITEM R |
|---|---|---|---|---|---|---|---|
| QUEST1 | ZERO | 50 | 50 | 50 | 50 | 0 | 0 |
| | ONE | 0 | 0 | 0 | 0 | 250 | 0 |
| | TWO | 0 | 0 | 0 | 0 | 0 | 250 |

FIG.7B

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2021/000298, filed on Jan. 7, 2021, which claims priority to Japanese Patent Application No. 2020-006191, filed on Jan. 17, 2020, the entire contents of which are incorporated by reference herein.

BACKGROUND ART

Technical Field

The present invention relates to information processing programs, information processing methods, and information processing systems.

There has hitherto been a known type of battle game in which a plurality of players form a team and play a battle against enemy characters in cooperation with each other, as disclosed in Patent Literature 1. In the battle game disclosed in Patent Literature 1, the game is run advantageously in the case where a novice player is included in the team compared with the case where no novice player is included in the team.

CITATION LIST

Patent Literature

Patent Literature 1: JP 2018-068619 A

SUMMARY OF INVENTION

Technical Problem

However, there are cases where advanced players consider that they can increase the game clearing rate by forming a team among advanced players. Also, there are cases where advanced players consider that they can reduce the game clearing time by forming a team among advanced players. Therefore, there has been a tendency that advanced players break up the team or withdraw from the team in the case where a novice player is included in the team. This has resulted in compromising the essence of a game that is played cooperatively by a plurality of players.

It is an object of the present invention to provide an information processing program, an information processing method, and an information processing system that make it possible to enhance the fun of a game that is played cooperatively by a plurality of players.

Solution to Problem

In order to solve the problem described above, an information processing program causes a computer to function as: a team formation unit that forms a team constituted of a plurality of players who try a specific battle game; a condition check unit that determines players who have cleared the specific battle game on the basis of player information of the plurality of players, and that determines that a reward acquiring condition is satisfied when it is determined that the team includes a first player and a second player, the first player being a player who has cleared the specific battle game, and the second player being a player who has not cleared the specific battle game; and a reward assignment unit that assigns a reward to the first player when it is determined that the reward acquiring condition is satisfied and the specific battle game has been cleared by the team.

The computer may be caused to function as a report unit that reports condition satisfaction information to the first player before the start of the specific battle game, the condition satisfaction information indicating that the reward acquiring condition is satisfied.

The condition check unit may execute the check concerning the reward acquiring condition when ready operations for the specific battle game have been performed by the individual players and ready information has been received from the individual players, whereby all the players in the team have entered a ready state; and the report unit may report the condition satisfaction information only to the first player.

The condition check unit may determine that the reward acquiring condition is not satisfied when the second player has left the team during the specific battle game; and the report unit may report condition non-satisfaction information to the first player, the condition non-satisfaction information indicating that the reward acquiring condition is no longer satisfied.

The condition check unit may determine whether or not the number of assignments of the reward to the first player during a certain period is less than an upper limit of the number of assignments in the case where the team includes the first player and the second player, and may determine that the reward acquiring condition is satisfied in the case where the number of assignments is less than the upper limit of the number of assignments, while determining that the reward acquiring condition is not satisfied in the case where the number of assignments is not less than the upper limit of the number of assignments.

The condition check unit may execute the check concerning the reward acquiring condition when the specific battle game has been cleared; and the reward assignment unit may omit the assignment of the reward to the first player in the case where the reward acquiring condition is not satisfied when the specific battle game has been cleared.

In order to solve the problem described above, an information processing method is an information processing method that is executed by one or both of a game terminal and a server that is capable of carrying out communication with the game terminal, the information processing method including: a step of forming a team constituted of a plurality of players who try a specific battle game; a step of determining players who have cleared the specific battle game on the basis of player information of the plurality of players, and determining that a reward acquiring condition is satisfied when it is determined that the team includes a first player and a second player, the first player being a player who has cleared the specific battle game, and the second player being a player who has not cleared the specific battle game; and a step of assigning a reward to the first player when it is determined that the reward acquiring condition is satisfied and the specific battle game has been cleared by the team.

In order to solve the problem described above, an information processing system is an information processing system including a game terminal and a server that is capable of carrying out communication with the game terminal, one or both of the game terminal and the server including: a team formation unit that forms a team constituted of a plurality of players who try a specific battle game;

a condition check unit that determines players who have cleared the specific battle game on the basis of player information of the plurality of players, and that determines that a reward acquiring condition is satisfied when it is determined that the team includes a first player and a second player, the first player being a player who has cleared the specific battle game, and the second player being a player who has not cleared the specific battle game; and a reward assignment unit that assigns a reward to the first player when it is determined that the reward acquiring condition is satisfied and the specific battle game has been cleared by the team.

Effects of Disclosure

The present invention makes it possible to enhance the fun of a game that is played cooperatively by a plurality of players.

BRIEF DESCRIPTION OF DRAWINGS

FIG. 7A is an illustration for explaining an example base reward lottery table.

FIG. 7B is an illustration for explaining an example number-of-continuations reward lottery table.

DESCRIPTION OF EMBODIMENTS

An aspect of an embodiment of the present invention will be described below in detail with reference to the accompanying drawings. The numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
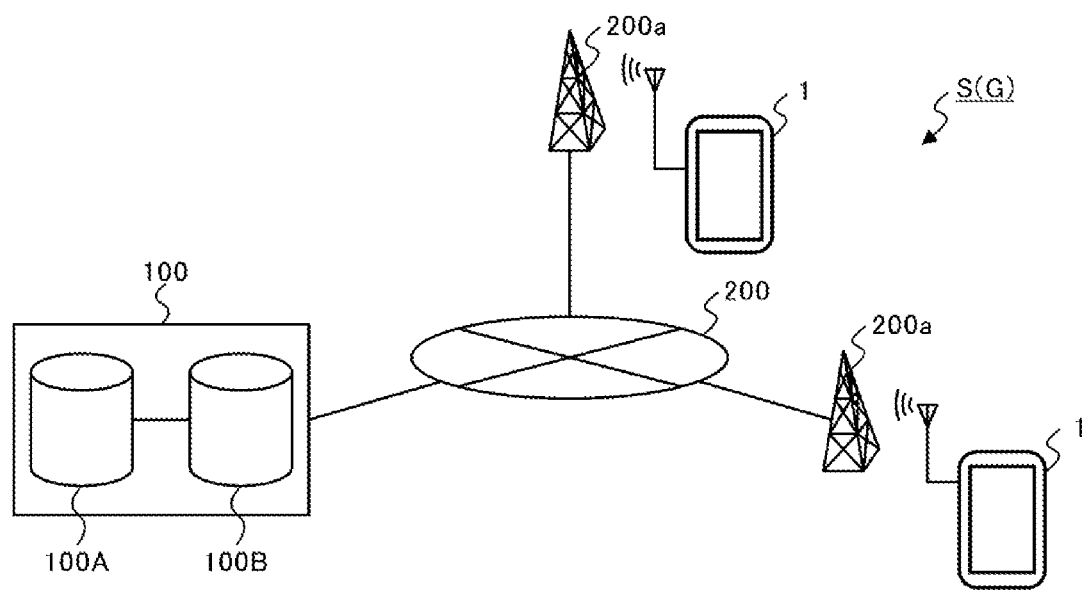
FIG. 1 is an explanatory illustration schematically showing the configuration of an information processing system.

FIG. 1 is an explanatory illustration schematically showing the configuration of an information processing system S. The information processing system S is what is called a client-server system including player terminals 1 (game terminals), a server 100, and a communication network 200 having communication base stations 200a.

In the information processing system S in this embodiment, each of the player terminals 1 and the server 100 function as a game device G. The player terminals 1 and the server 100 individually share roles for controlling the proceedings of games, and it becomes possible to proceed with the games through cooperation between the player terminals 1 and the server 100.

The player terminals 1 can establish communication with the server 100 via the communication network 200. The player terminals 1 include a wide range of electronic appliances that are capable of communicatively connecting to the server 100 in a wireless or wired manner. Examples of the player terminals 1 include smartphones, mobile phones, tablet devices, personal computers, and game machines. This embodiment will be described in the context of a case where smartphones are used as the player terminals 1.

The server 100 is communicatively connected to the plurality of player terminals 1. The server 100 includes a management server 100A and a battle game server 100B. The management server 100A accumulates various kinds of information (player information) for each player who plays the games. Furthermore, the management server 100A mainly carries out processing such as updating the accumulated information and downloading images and various kinds of information to the player terminals 1, on the basis of operations input from the player terminals 1.

Furthermore, the information processing system S realizes battle games in which a plurality of players form a team and cooperatively play a battle against enemy characters. The battle game server 100B mainly carries out processing for controlling the proceeding of each of the battle games, such as creating a room for carrying out the battle game, allocation of players to the room, transmission/reception of information to/from a plurality of player terminals 1 connected to the room, and synchronization among the plurality of player terminals 1.

Hereinafter, of the games provided by the information processing system S, battle games will be referred to as in-games, and games other than battle games will be referred to as out-games. The management server 100A mainly carries out processing concerning out-games, and the battle game server 100B mainly carries out processing concerning in-games.

The communication base stations 200a are connected to the communication network 200, and transmit information to and receive information from the player terminals 1 in a wireless manner. The communication network 200 is implemented by a mobile phone network, an Internet network, a local area network (LAN), a special circuit, or the like, and realizes wireless or wired communicative connections between the player terminals 1 and the server 100.

(Hardware Configurations of Player Terminals 1 and Server 100)

Figure 2A:
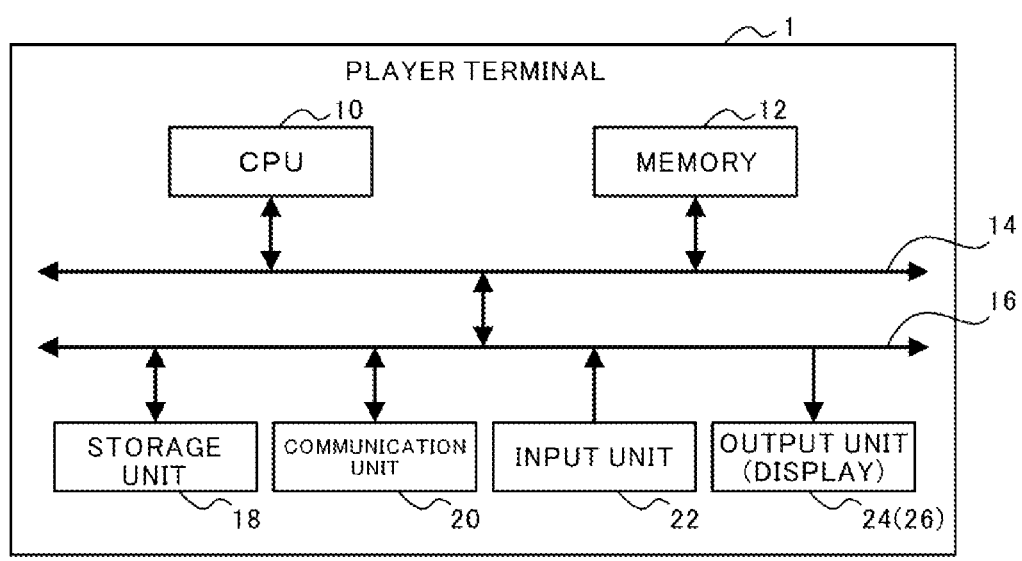
FIG. 2A is an illustration for explaining the hardware configuration of a player terminal.
Figure 2B:
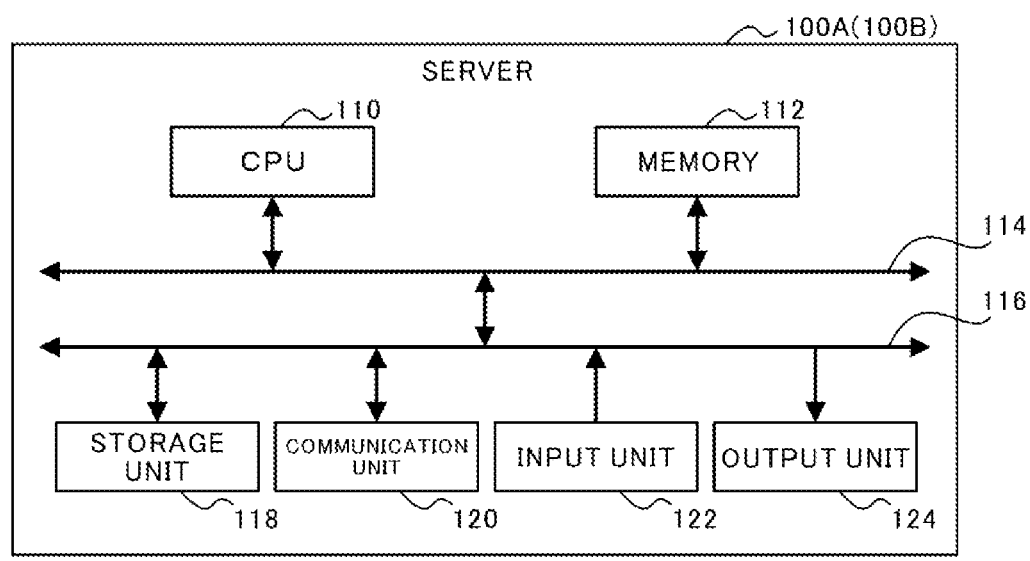
FIG. 2B is an illustration for explaining the hardware configuration of a server.

FIG. 2A is a diagram for explaining the hardware configuration of each of the player terminals 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the management server 100A and the battle game server 100B are configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the management server 100A and the battle game server 100B are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminals 1, while omitting descriptions of the management server 100A and the battle game server 100B.

The CPU 10 runs programs stored in the memory 12 to control the proceedings of the games. The memory 12 is configured of a read only memory (ROM) or a random access memory (RAM), and stores the programs and various kinds of data needed for controlling the proceedings of the games. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to a communication base station 200a in a wireless manner, and transmits information to and receives information from the server 100 via the communication network 200, such as various kinds of data and programs. In the player terminal 1, programs, etc. received from the server 100 are stored in the memory 12 or the storage unit 18.

The input unit 22 is configured of a unit via which player operations are input (operations are accepted), such as a touchscreen, buttons, a keyboard, a mouse, a cross keypad, or an analog controller. Alternatively, the input unit 22 may be a special controller provided at the player terminal 1 or connected (externally) to the player terminal 1. Yet alternatively, the input unit 22 may be configured of an acceleration sensor that detects tilting or movement of the player terminal 1 or a microphone that detects player's voice. That is, examples of the input unit 22 include a wide range of devices that enable the input of player's intents in distinguishable manners.

The output unit 24 is configured to include a display device and a speaker. Note that the output unit 24 may be a device connected (externally) to the player terminal 1. In this embodiment, the player terminal 1 includes a display 26 as the output unit 24, and includes a touchscreen provided as stacked on the display 26 as the input unit 22.

(Game Content)

Next, the content of the games provided by the information processing system S (game device G) in this embodiment will be described by using an example. A player can possess ally characters acquired through lotteries called gacha, as well as ally characters distributed from the administration side. The player can form a party by selecting a plurality of (four here) characters from the ally characters possessed by the player (hereinafter referred to as possessed characters), and can play a battle game in which the player plays a battle against enemy characters by using the party formed.

Figure 3A:
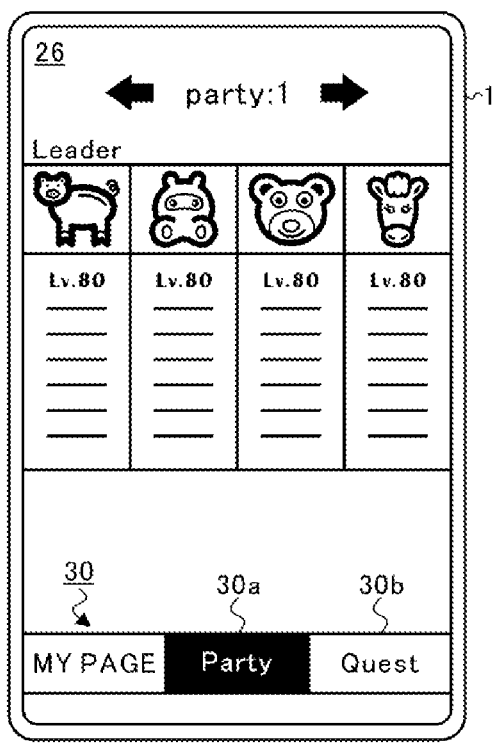
FIG. 3A is an illustration for explaining an example party formation screen.
Figure 3B:
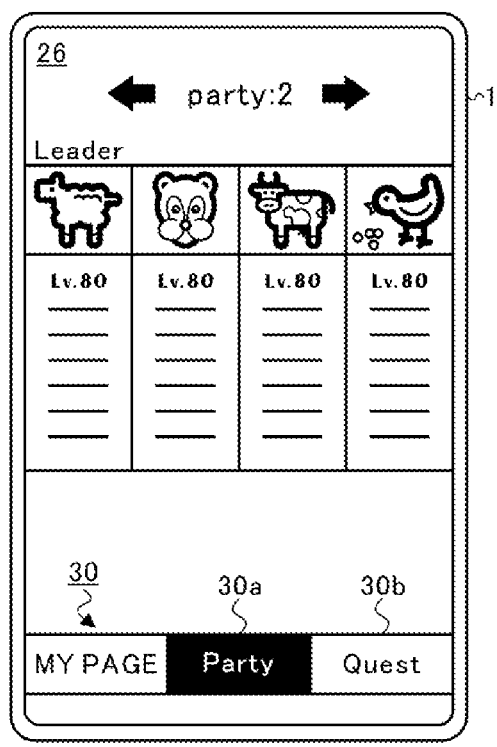
FIG. 3B is an illustration for explaining an example party formation screen.

FIGS. 3A and 3B are illustrations for explaining example party formation screens. During an out-game, a menu bar 30 is displayed in a lower part of the display 26. In the menu bar 30, a plurality of selecting parts including a party-formation selecting part 30a and a quest selecting part 30b are provided. When the party-formation selecting part 30a is tapped, a party formation screen is displayed, as shown in FIG. 3A. In the party formation screen, information concerning a party formed by the player (party information) is displayed.

The player registers a party by selecting four possessed characters at most. In the party formation screen, information concerning the ally characters constituting the registered party (hereinafter referred to as party forming characters) is displayed as arrayed side by side. Specifically, the player can register four possessed characters in a party as a first party forming character, a second party forming character, a third party forming character, and a fourth party forming character. In the party formation screen, information concerning the first party forming character, the second party forming character, the third party forming character, and the fourth party forming character is displayed in this order from the left.

When the region where information concerning one of the party forming characters is tapped to select that party forming character, a possessed character list screen, which is not shown, is displayed. The player can replace the party forming character by selecting one of the possessed characters in the possessed character list screen.

Note that the first party forming character displayed leftmost in the party formation screen is registered as the leader of the party. In the party formation screen, the leader can be changed, for example, by tapping another party forming character after tapping the first party forming character. That is, the player can register a party forming character that serves as the leader in the party formation screen.

Furthermore, the player can register a plurality of parties in advance. Here, it is possible to register nine parties at most. In the party formation screen, when a flick operation in the horizontal direction is input, the party information that is displayed is switched. For example, when a leftward flick operation is input in the state where party information concerning a first party is displayed, as shown in FIG. 3A, party information concerning a second party is displayed, as shown in FIG. 3B.

The party whose party information is displayed in the party formation screen is registered as a party currently selected by the player. Suppose, for example, that another selecting part in the menu bar 30 is tapped in the state where the party information concerning the second party is displayed, as shown in FIG. 3B, whereby the displaying of the party formation screen is terminated. In this case, the second party, whose party information was displayed at the timing of closing of the party formation screen, is registered as the currently selected party.

Note that each ally character has set therefor parameters such as hit points (hereinafter referred to as HP) and an attacking ability. The player can raise possessed characters, and can enhance various kinds of parameters by advancing the levels of possessed characters. In the party information displayed in the party formation screen, the parameters of the individual party forming characters are displayed.

Furthermore, although not described in detail, in the party formation screen, each of the party forming characters can be equipped with equipment such as a weapon, as well as a dragon. By providing equipment, the player can advantageously proceed with a battle game; for example, the player can increase parameters, such as the HPs and the attacking abilities, of the party forming characters participating in a battle game (hereinafter referred to as participating characters), or can decrease parameters of enemy characters.

Furthermore, a dragon is a character into which a participating character can transform itself. When a prescribed condition is satisfied during a battle game, for a limited period, the player can transform a participating character into the dragon that the participating character is equipped with. Since a dragon can give great damage to enemy characters, it becomes possible to advantageously proceed with a battle game by transforming a participating character into a dragon.

Furthermore, each possessed character and each item of equipment has a skill set therefor in advance. A skill refers to a special ability that becomes available when a prescribed condition is satisfied during a battle game. The player can advantageously proceed with a battle game by using a skill. For example, the player can change various kinds of parameters by using skills, such as giving damage to enemy characters, increasing the attacking abilities of participating characters, recovering the HPs of participating characters, and decreasing the attacking abilities of enemy characters. In the party information displayed in the party formation screen, equipment information concerning the equipment and dragons of the individual party forming characters, as well as information concerning the skills, are displayed.

Figure 4A:
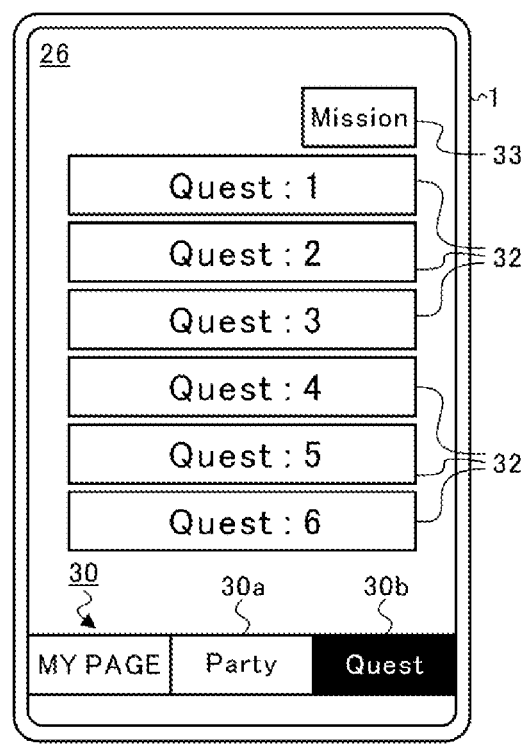
FIG. 4A is an illustration for explaining an example quest selection screen.
Figure 4B:
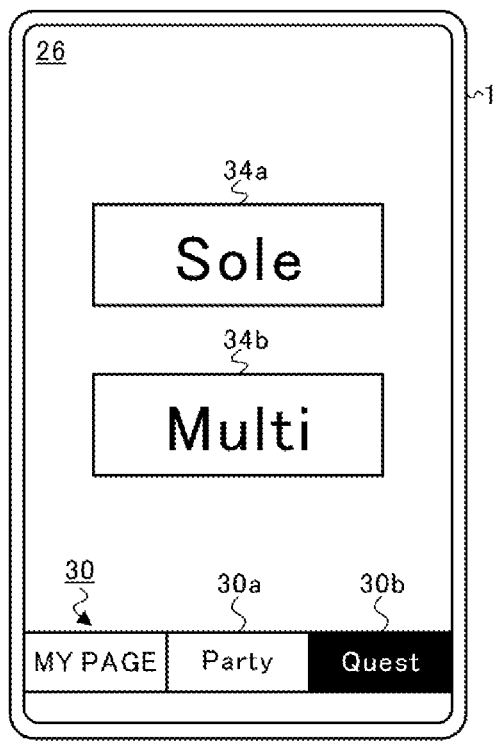
FIG. 4B is an illustration for explaining an example play-mode selection screen.
Figure 4C:
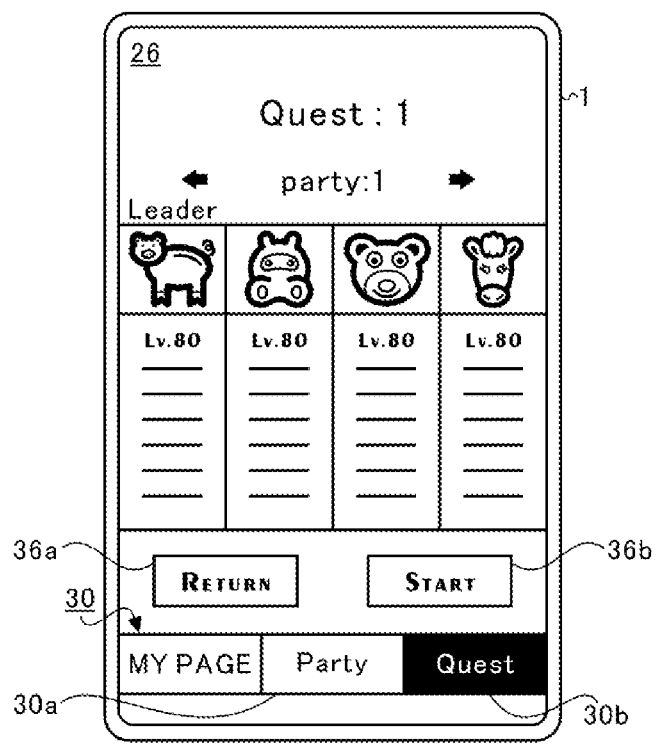
FIG. 4C is an illustration for explaining an example party selection screen.

FIG. 4A is an illustration for explaining an example quest selection screen. FIG. 4B is an illustration for explaining an example play-mode selection screen. FIG. 4C is an illustration for explaining an example party selection screen. When the quest selecting part 30b in the menu bar 30 is tapped, the quest selection screen shown in FIG. 4A is displayed. Here, a quest refers to a type of battle game, and can be considered as the content of a battle game. In this embodiment, a plurality of quests are provided, and a plurality of quest-selection operating parts 32 and a mission-confirmation operating part 33 are provided in the quest selection screen.

The player can play a battle game by tapping one of the quest-selection operating parts 32 to select one of the quests. When one of the quest-selection operating parts 32 is tapped, the play-mode selection screen shown in FIG. 4B is displayed. In the play-mode selection screen, a solo-play selecting part 34a and a multi-play selecting part 34b are displayed. For each quest, it is possible to select either solo-play, in which the player operating the player terminal 1 plays a game alone, or multi-play, in which a plurality of player terminals 1 are communicatively connected and the individual players (a plurality of players) cooperatively play a game.

Note that although the description here will be given in the context of quests for which it is possible to select both solo-play and multi-play, quests for which only solo-play is possible and quests for which only multi-play is possible may be provided. The player can select solo-play as the play mode by tapping the solo-play selecting part 34a, and can select multi-play as the play mode by tapping the multi-play selecting part 34b. The following describes the specific content of battle games, where the description will be directed first to a battle game via solo-play and then to a battle game via multi-play.

(Solo-Play)

When the solo-play selecting part 34a is tapped in the play-mode selection screen, the party selection screen shown in FIG. 4C is displayed. In the party selection screen, in which party information is displayed as shown in the figure, party information concerning the registered currently selected party is displayed at the time of transition to the party selection screen. In the party selection screen, the player can switch the party information displayed on the display 26, for example, by performing a flick operation in the horizontal direction. When the party information is switched in the party selection screen, the registered currently selected party is also changed. That is, the player can change the currently selected party in the party selection screen.

Furthermore, in the party selection screen, a return button 36a and a start button 36b are displayed. When the return button 36a is tapped, a screen transition occurs from the party selection screen shown in FIG. 4C to the play-mode selection screen shown in FIG. 4B. Meanwhile, when the start button 36b is tapped, a battle game via solo-play using the registered currently selected party is started.

Figure 5A:
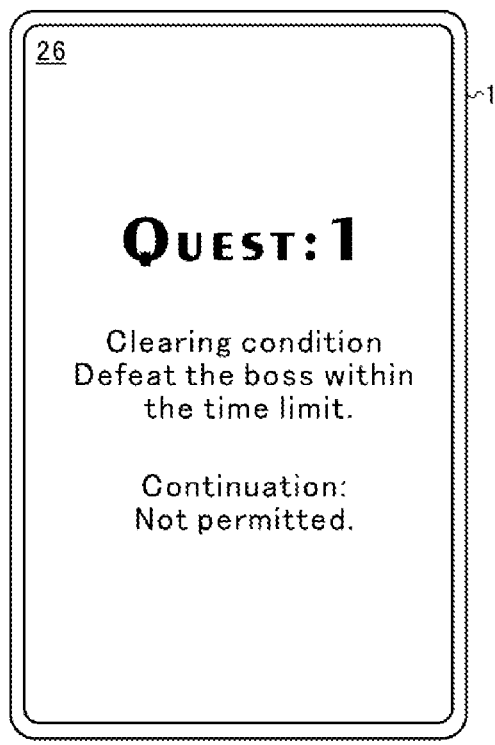
FIG. 5A is an illustration for explaining an example quest start screen.

FIG. 5A is an illustration for explaining an example quest start screen. When a battle game is started, the quest start screen is displayed, as shown in FIG. 5A. In the quest start screen, information concerning the quest (battle game) being started (quest information) is displayed. Here, as the quest information, a clearing condition for clearing the quest (also referred to as a winning condition for the player), as well as whether or not continuation is permitted, are displayed.

Each quest has set therefor a clearing condition. Here, as an example, defeating the boss character among enemy characters within a time limit is set as a clearing condition. Note that clearing conditions are set in advance for individual quests, and other examples of clearing conditions include annihilating all the enemy characters.

Furthermore, each quest has set therefor whether or not continuation is permitted, as well as the number of continuations permitted. In this embodiment, in a battle game via solo-play, the player is defeated on condition that all the participating characters have entered a continuation disabled state, i.e., on condition that all the participating characters have been annihilated.

Here, the state in which the HP of a participating character have become zero is defined as a continuation disabled state, and the state in which the HP of a participating character has not become zero is defined as a continuation enabled state. Participating characters in the continuation enabled state operate on the basis of operations input to the player terminal 1 or on the basis of computer control, while participating characters in the continuation disabled state are disabled from operating.

In a continuable quest, in the case where all the participating characters have been annihilated, the player can select whether or not to continue the quest by consuming a prescribed in-game currency. When the player executes continuation, all the participating characters are restored from the continuation disabled state to the continuation enabled state, which makes it possible to continue the quest (battle game).

That is, in a continuable state, when all the participating characters have been annihilated, the player's defeat is not yet determined. Therefore, the player can avoid a defeat by executing continuation. Meanwhile, in the case where the player does not execute continuation or cannot execute continuation, the player's defeat is determined when all the participating characters have been annihilated.

Figure 5B:
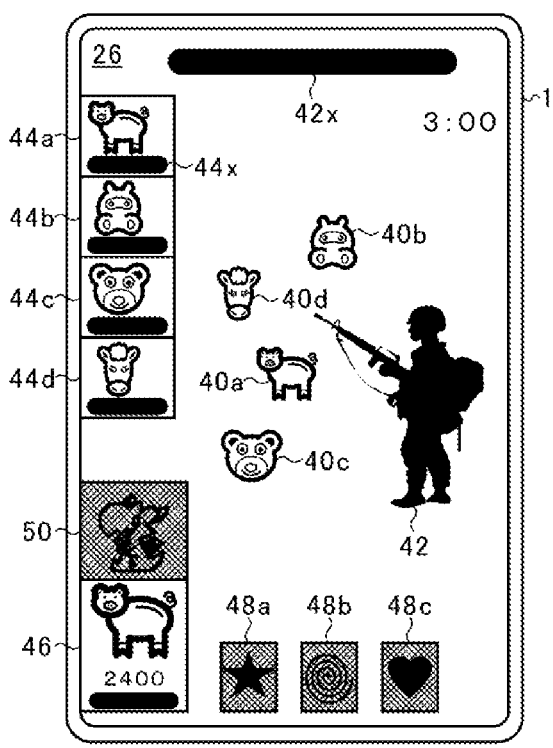
FIG. 5B is an illustration for explaining an example battle game screen during a battle game via solo-play.
Figure 5C:
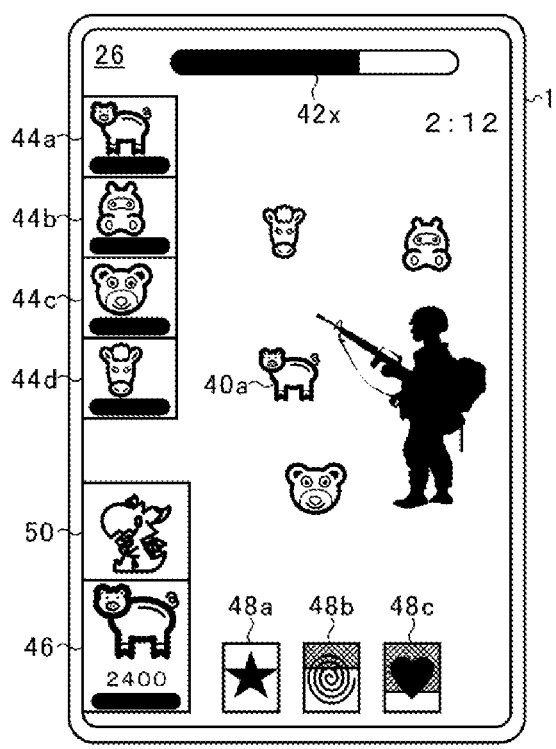
FIG. 5C is an illustration for explaining an example of skill gauges and a dragonization gauge.
Figure 5D:
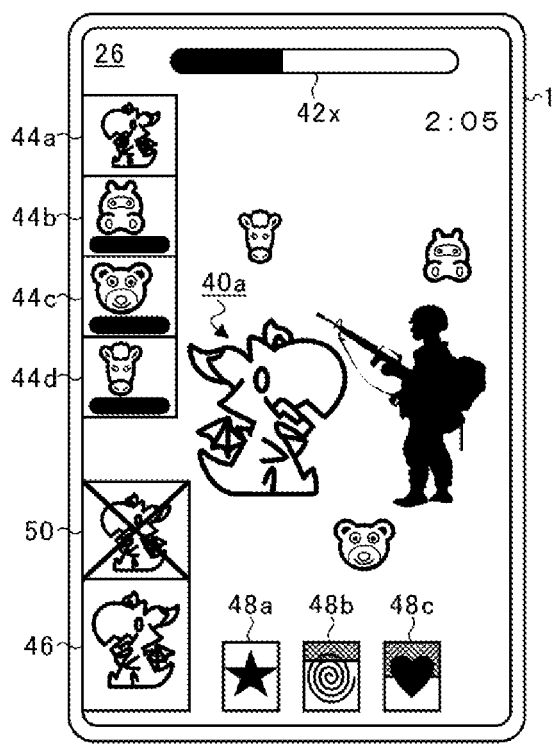
FIG. 5D is an illustration for explaining dragonization.

FIG. 5B is an illustration for explaining an example battle game screen during a battle game via solo-play. FIG. 5C is an illustration for explaining an example of skill gauges 48a, 48b, and 48c and a dragonization gauge 50. FIG. 5D is an illustration for explaining dragonization. When a battle game is started and the quest start screen shown in FIG. 5A is displayed for a prescribed period, the battle game screen is displayed, as shown in FIG. 5B. In the battle game screen, a virtual game field is displayed, and a first participating character 40a, a second participating character 40b, a third participating character 40c, and a fourth participating character 40d, which are participating characters, as well as a boss character 42, which is an enemy character, are displayed in the game field. Note that the first participating character 40a to the fourth participating character 40d are the first party forming character to the fourth party forming character, respectively. Therefore, the first participating character 40a is a participating character registered as the leader.

In a battle game, one of the four participating characters is set as an operable character, which can be operated by the player. That is, the operable character is a participating character that operates on the basis of operations input to the player terminal 1. When a battle game is started, the participating character registered as the leader, i.e., the first participating character 40a, is set as the operable character.

By tapping the region where the game field is displayed in the battle game screen, the player can cause the operable character to perform an attacking action or can cause the operable character to move in the operated direction by performing a slide operation or flick operation. Meanwhile, the three participating characters, not including the operable character, operate on the basis of computer control. Hereinafter, participating characters that operate on the basis of computer control will be referred to as non-operated characters.

The player can change the operable character during a battle game. Specifically, in the battle game screen, a first character-information displaying part 44a, a second character-information displaying part 44b, a third character-information displaying part 44c, and a fourth character-information displaying part 44d are displayed as character-information displaying parts. The first character-information displaying part 44a to the fourth character-information displaying part 44d respectively correspond to the first participating character 40a to the fourth participating character 40d, and display information concerning the corresponding participating characters.

The player can switch the operable character by tapping one of the character-information displaying parts. For example, when the fourth character-information displaying part 44d is tapped in the state where the first participating character 40a is set as the operable character, the fourth participating character 40d is set as the operable character, and the first participating character 40a is set as a non-operated character. This makes it possible for the player to operate the fourth participating character 40d by inputting operations to the player terminal 1.

Note that the individual character-information displaying parts display character images so that the corresponding participating characters can be identified, and also display HP meters 44x indicating the HPs of the corresponding participating characters.

Furthermore, in a lower left part of the battle game screen, an operable-character displaying part 46 is displayed separately from the character-information displaying parts. The operable-character displaying part 46 serves to report the participating character currently set as the operable character, as well as the HP of the operable character.

Furthermore, three skill gauges 48a, 48b, and 48c are displayed in the battle game screen. As described earlier, characters and equipment have available skills set therefor in advance. The skill gauges 48a, 48b, and 48c report the specifics of the skills available to the operable character, whether or not the use of the skills is permitted, and the gauge values remaining before the skills become available.

Specifically, each skill has set therefor in advance a gauge value that is necessary for the skill to become available. The gauge values of the skill gauges 48a, 48b, and 48c increase, for example, in accordance with the values of damage given to the boss character or the like by the operable character. In the state where a gauge value is less than the necessary gauge value, the corresponding skill is not available, and the skill becomes available when the gauge value becomes greater than or equal to the necessary gauge value. The gauge values are managed on a per-skill basis, and in the state where the skills are unavailable, one or all of the skill gauges 48*a*, 48*b*, and 48*c* are grayed out, as shown in FIG. 5B. Then, as the gauge values increase and approach the necessary gauge values, the grayed-out areas decrease, as shown in FIG. 5C.

FIG. 5C shows the state in which the skill corresponding to the skill gauge 48*a* is available and the skills corresponding to the skill gauges 48*b* and 48*c* are unavailable. In the state shown in FIG. 5C, the player can use the skill corresponding to the skill gauge 48*a* by tapping the skill gauge 48*a*. When the skill is used, the gauge value corresponding to the skill becomes zero, whereby the skill becomes unavailable. In this manner, the skill gauges 48*a*, 48*b*, and 48*c* also function as operating parts for using skills.

Furthermore, in the battle game screen, a dragonization gauge 50 is displayed. As described earlier, each participating character can be equipped with a dragon. The dragonization gauge 50 reports a dragon that the operable character is equipped with, whether or not transformation into the dragon is permitted, and the gauge value remaining before transformation into the dragon becomes possible.

Specifically, each dragon or each participating character has set therefor in advance a gauge value necessary for enabling transformation into the dragon. The gauge value of the dragonization gauge 50 increases, for example, in accordance with the value of damage given to the boss character 42 or the like by the operable character. Transformation into the dragon is not permitted in the state where the gauge value is less than the necessary gauge value, and transformation into the dragon is enabled when the gauge value becomes greater than or equal to the necessary gauge value. The gauge value necessary for transformation into the dragon is managed separately from the skills described above, and in the state where transformation into the dragon is disabled, the dragonization gauge 50 is partially or entirely grayed out, as shown in FIG. 5B. Then, as the gauge value increases and approaches the necessary gauge value, the grayed-out area decreases.

FIG. 5C shows the state in which the operable character can transform itself into the dragon that the operable character is equipped with. In the state shown in FIG. 5C, the player can transform the operable character into the dragon by tapping the dragonization gauge 50. For example, when the dragonization gauge 50 is tapped in the state shown in FIG. 5C, the operable character (the first participating character 40*a* here) transforms itself into the dragon, as shown in FIG. 5D. In this state, the dragon is displayed in the operable-character displaying part 46 and the character-information displaying part corresponding to the operable character (the first character-information displaying part 44*a* here), and the dragon can be operated by inputting operations to the player terminal 1.

Upon the transformation into the dragon, the gauge value for the dragon becomes zero, whereby transformation into the dragon is again disabled. During the period in which the operable character is transformed into the dragon, the dragonization gauge 50 is displayed in the manner shown in FIG. 5D. The period during which transformation into the dragon is enabled (transformation enabled period) is set in advance, and after the expiration of the transformation enabled period, the dragon is transformed back to the original participating character (the first participating character 40*a* here), and the dragonization gauge 50 is displayed in a grayed-out manner, as shown in FIG. 5B.

Although not described in detail, gauge values for dragons and gauge values for individual skills are also managed in relation to non-operated characters. However, with non-operated characters, although there are cases where the skills are used under computer control, transformation into a dragon does not occur.

Furthermore, in an upper part of the battle game screen, a boss-character HP meter 42*x* indicating the HP of the boss character 42, as well as a time limit, i.e., the time remaining before the end of the battle game, are displayed. Each battle game has a clearing condition (winning condition) and a defeat condition (failure to satisfy the clearing condition) set therefor in advance. The player wins when the winning condition is satisfied in the battle game, and when the defeat condition is satisfied, the player is defeated, and the battle game comes to an end. Here, the condition that the HP of the boss character 42 have become zero is set as the winning condition, and thus the player wins when the HP of the boss character 42 have become zero.

Figure 6A:
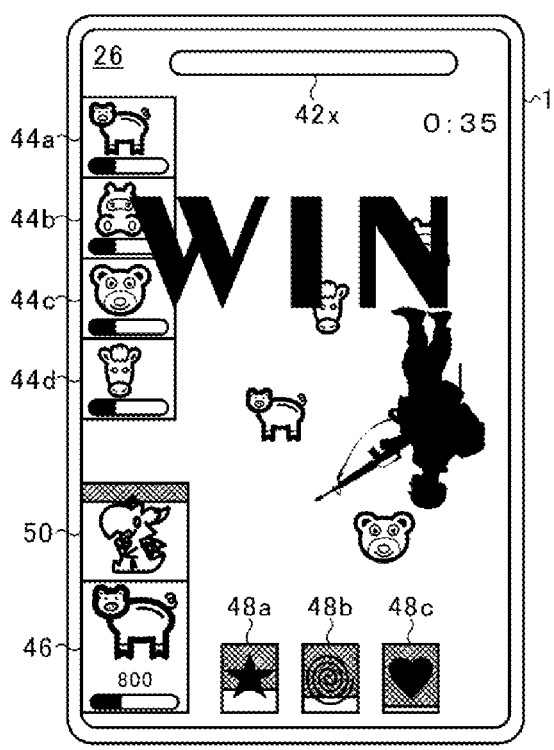
FIG. 6A is an illustration for explaining an example battle game screen for the case of a victory for a player.
Figure 6B:
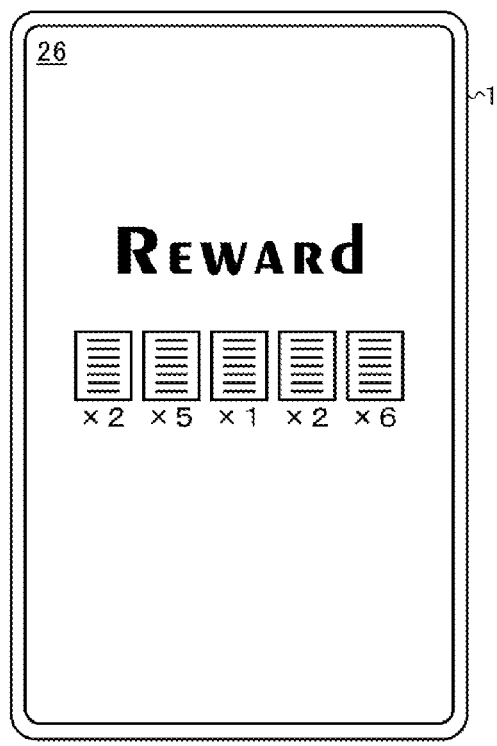
FIG. 6B is an illustration for explaining an example reward screen.

FIG. 6A is an illustration for explaining an example battle game screen for the case of a victory for the player. FIG. 6B is an illustration for explaining an example reward screen. When the HP of the boss character 42 have become zero, an image reporting a victory for the player is displayed, as shown in FIG. 6A, and the battle game comes to an end. Then, the reward screen is displayed, as shown in FIG. 6B, reporting the reward acquired as a result of the success in the quest, i.e., the victory in the battle game. The reward that can be acquired by the player varies among the individual quests, and also varies depending on the number of continuations.

FIG. 7A is an illustration for explaining an example base reward lottery table. FIG. 7B is an illustration for explaining an example number-of-continuations reward lottery table. Upon a success in a quest through solo-play (satisfaction of the clearing condition), quest end information is transmitted to the server 100. The quest end information includes the type of the successful quest, as well as information identifying the number of continuations executed by the player. Upon receiving the quest end information, the server 100 determines rewards to be assigned to the player through a lottery.

Specifically, the server 100 has provided therein the base reward lottery table shown in FIG. 7A and the number-of-continuations reward lottery table shown in FIG. 7B. According to the base reward lottery table, the ratios for selecting rewards to be assigned to the player are set for each quest. Furthermore, the number-of-continuations reward lottery table is provided for each quest. According to each of the number-of-continuations reward lottery tables, the ratios for selecting rewards to be assigned to the player are set for each number of continuations. Here, the selecting ratios are set so that rewards having higher rarity values can be acquired as the number of times that continuation processing has been executed becomes fewer.

At the server 100, upon receiving the quest end information, a base reward lottery using the base reward lottery table and a number-of-continuations reward lottery using the number-of-continuations reward lottery table are executed individually. That is, upon succeeding in a quest, the player can acquire base rewards irrespective of the number of continuations, which serve as common rewards, and can additionally acquire number-of-continuations rewards, which are rewards depending on the number of continuations.

Note that the method of determining rewards to be assigned to the player is merely an example. For example, number-of-continuations rewards are not necessary, and common base rewards alone may be determined irrespective of the number of continuations, or the number of lotteries for base rewards may be varied depending on the number of continuations. As an example, the number of lotteries for base rewards may be increased as the number of continuations becomes fewer. As another example, instead of determining number-of-continuations rewards through a lottery, prescribed number-of-continuations rewards set in advance may be assigned depending on the number of continuations.

(Multi-Play)

Figure 8A:
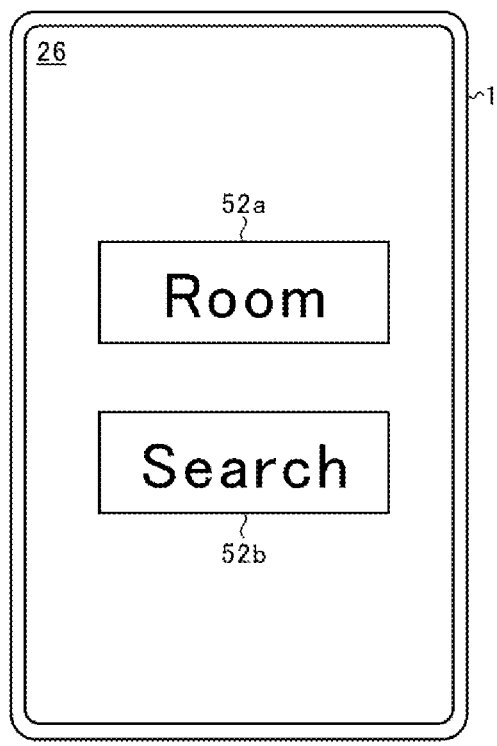
FIG. 8A is an illustration for explaining an example room selection screen.
Figure 8B:
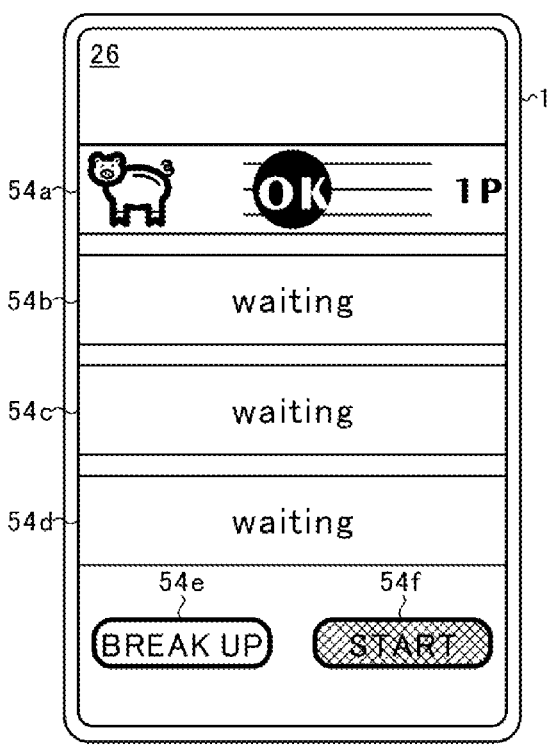
FIG. 8B is an illustration for explaining an example room wait screen.
Figure 8C:
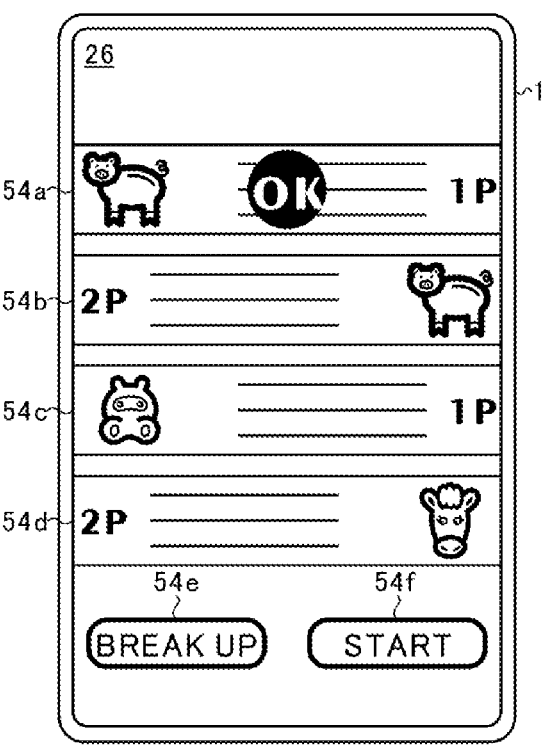
FIG. 8C is a first illustration for explaining corresponding relationships between players and non-operated characters.
Figure 8D:
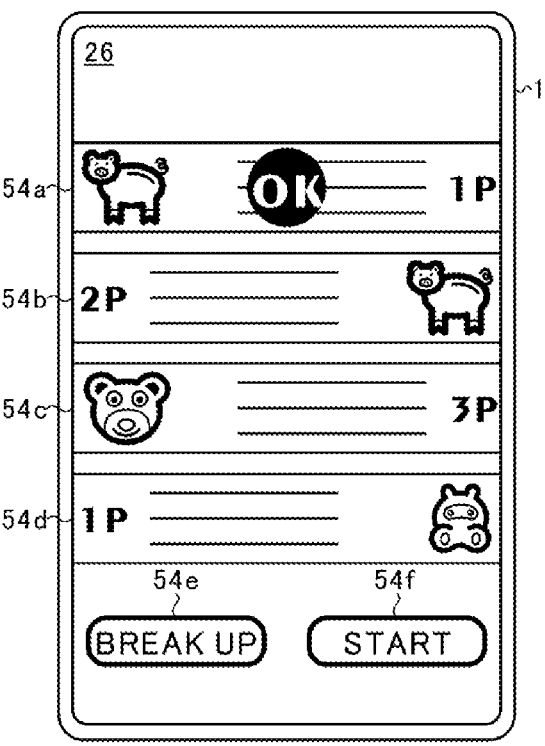
FIG. 8D is a second illustration for explaining corresponding relationships between players and non-operated characters.

Next, a battle game via multi-play will be described. FIG. 8A is an illustration for explaining an example room selection screen. FIG. 8B is an illustration for explaining an example room wait screen. FIG. 8C is a first illustration for explaining corresponding relationships between players and non-operated characters. FIG. 8D is a second illustration for explaining corresponding relationships between players and non-operated characters. When the multi-play selecting part 34b is tapped in the play-mode selection screen shown in FIG. 4B, the room selection screen shown in FIG. 8A is displayed. In the room selection screen, a room creating button 52a and a room searching button 52b are displayed.

The player can create a room by himself or herself by tapping the room creating button 52a. Also, the player can search for a room created by another player by tapping the room searching button 52b, and can enter the room if such a room is found. In this embodiment, a room refers to both a virtual space in which a battle game is played and a processing area for managing the battle game at the battle game server 100B.

When the room creating button 52a is tapped, a room is created at the battle game server 100B. When the room has been created, information concerning the player who has created the room (hereinafter referred to as a host player) is registered in association with the room as entrant information at the battle game server 100B. Hereinafter, a battle game selected by a host player and set when a room is created will also be referred to as a specific battle game.

Here, party information concerning the currently selected party set at the player terminal 1 of the host player (hereinafter referred to as a host terminal) when the room creating button 52a is tapped is transmitted to the battle game server 100B. At the battle game server 100B, the party information received from the host terminal is registered as entrant information in association with the host player and the host terminal. Furthermore, at the battle game server 100B, of the party information received from the host terminal, the party forming character set as the leader is registered in association with the host player (host terminal) as a participating character and the operable character (first operable character).

At the host terminal, the room wait screen shown in FIG. 8B is displayed. In the room wait screen, a first player-information displaying part 54a, a second player-information displaying part 54b, a third player-information displaying part 54c, and a fourth player-information displaying part 54d are displayed. In the first player-information displaying part 54a, information concerning the operable character of the host player (first operable character) is displayed. In the second player-information displaying part 54b, the third player-information displaying part 54c, and the fourth player-information displaying part 54d, "waiting" is displayed to report that the entrance of other players is being awaited.

In the room wait screen displayed at the host terminal, a breakup button 54e and a start button 54f are provided. The room disappears when the breakup button 54e is tapped by the host player, and the battle game is started when the start button 54f is tapped. Note that in the case where no player other than the host player has entered the room, it is not possible to start the battle game, and thus the start button 54f is disabled. In the state where the start button 54f is disabled, the start button 54f is grayed out, as shown in FIG. 8B.

Meanwhile, suppose that the room searching button 52b has been tapped in the room selection screen shown in FIG. 8 at the player terminal 1 of another player and that a room has been found. In this case, the player who has tapped the room searching button 52b (hereinafter referred to as a guest player) enters the room. That is, party information concerning the currently selected party set at the player terminal 1 of the guest player (hereinafter referred to as a guest terminal) when the room searching button 52b is tapped is transmitted to the battle game server 100B.

At the battle game server 100B, the party information received from the guest terminal is registered as entrant information in association with the guest player and the guest terminal. Furthermore, at the battle game server 100B, of the party information received from the guest terminal, the party forming character set as the leader is registered in association with the guest player (guest terminal) as a participating character and an operable character (second operable character here).

For example, suppose that a guest player (first guest player) has entered the room in the state shown in FIG. 8B. In this case, in the room wait screen at the host terminal, information concerning the operable character of the first guest player (second operable character) is displayed in the second player-information displaying part 54b, as shown in FIG. 8C.

Here, with the battle game via multi-play, a capacity (four here) defining the upper limit of the number of participating characters that can be registered is provided. In the case where one or more guest players have entered the room, a number of non-operated characters corresponding to the difference between the number of registered operable characters and the capacity are registered as participating characters at the battle game server 100B. Therefore, for example, in the case where the host player and a guest player have entered the room, two non-operated characters are registered.

Here, as shown in FIG. 8C, a party forming character is registered as a participating character and a non-operated character (first non-operated character) on the basis of the party information of the host player, and a party forming character is registered as a participating character and a non-operated character (second non-operated character) on the basis of the party information of the first guest player. At this time, the first non-operated character is associated with the host player, and the second non-operated character is associated with the first guest player.

At this time, as shown in FIG. 8C, in the room wait screen, information concerning the first non-operated character is displayed in the third player-information displaying part 54c, and information concerning the second non-operated character is displayed in the fourth player-information displaying part 54d. Furthermore, in this state, the start button 54f is enabled, and the host player can start the battle game.

Furthermore, also in this case, other guest players can further enter the room. Therefore, for example, when another guest player (second guest player) has entered the room, information concerning the operable character of the second guest player (third operable character) is displayed in the third player-information displaying part 54c, as shown in FIG. 8D.

Furthermore, in this state, the difference between the number of registered operable characters and the capacity is one. In this case, one party forming character is registered as a participating character and a non-operated character (first non-operated character) on the basis of the party information of the host player. Therefore, in the room wait screen, information concerning the first non-operated character is displayed in the fourth player-information displaying part 54d, as shown in FIG. 8D.

In this embodiment, in the case where two players, namely, the host player and the first guest player, have entered the room, the first party forming character of the host player is registered as the first operable character, and the second party forming character of the host player is registered as the first non-operated character. Furthermore, the first party forming character of the first guest player is registered as the second operable character, and the second party forming character of the first guest player is registered as the second non-operated character.

Furthermore, in the case where three players, namely, the host player, the first guest player, and the second guest player, have entered the room, the first party forming character of the host player is registered as the first operable character, and the second party forming character of the host player is registered as the first non-operated character. Furthermore, the first party forming character of the first guest player is registered as the second operable character, and the first party forming character of the second guest player is registered as the third operable character.

Furthermore, in the case where four players, namely, the host player, the first guest player, the second guest player, and the third guest player, have entered the room, the first party forming character of the host player is registered as the first operable player, the first party forming character of the first guest player is registered as the second operable character, the first party forming character of the second guest player is registered as the third operable character, and the first party forming character of the third guest player is registered as the fourth operable character.

Figure 9A:
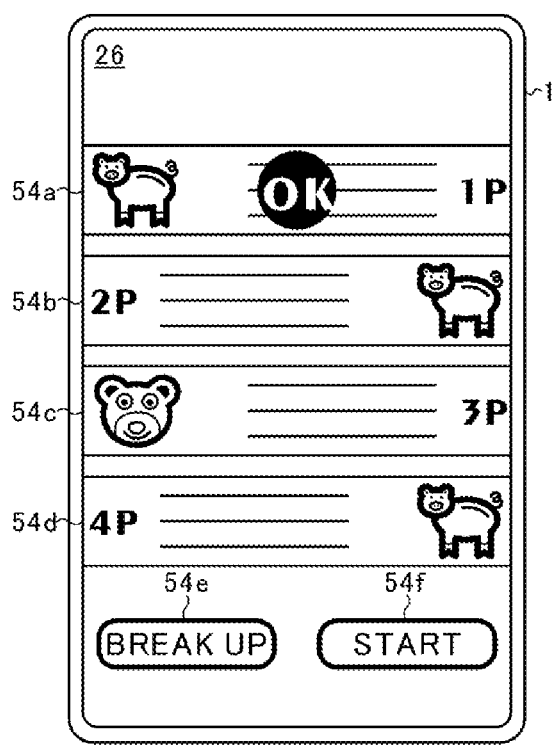
FIG. 9A is an illustration for explaining a state where a room is full.
Figure 9B:
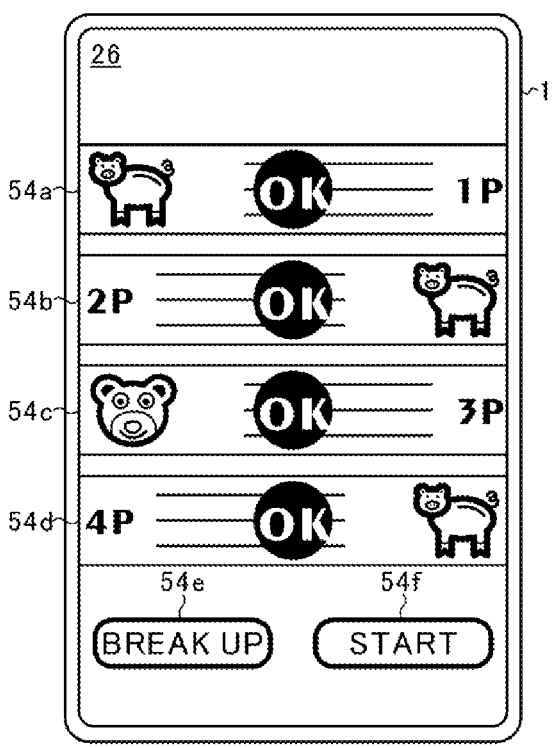
FIG. 9B is an illustration for explaining a ready state.

FIG. 9A is an illustration for explaining the state where the room is full. FIG. 9B is an illustration for explaining a ready state. As shown in FIG. 9A, when four players have entered the room, the room becomes full, which prohibits further players from entering the room. Although not shown, in the room wait screen displayed at a guest terminal, an exit button and a ready button are displayed instead of the breakup button 54e and the start button 54f.

When the exit button is tapped at the guest terminal, information concerning the corresponding guest player registered at the battle game server 100B is deleted. Accordingly, the guest player who has tapped the exit button leaves the room. Therefore, for example, when a guest player leaves the room in the full state, it becomes possible again for a guest player to enter the room.

Furthermore, in the room wait screen, it is possible to change the participating characters (operable characters and non-operated characters) by performing a prescribed operation. When the operation for changing the participating characters is performed at the player terminal 1, party information, etc. after the change is transmitted to the battle game server 100B, and new participating characters, operable characters, and non-operated characters are registered. In this case, information concerning the participating characters after the change is displayed at the player terminals 1 of the other players.

Furthermore, when the ready button is tapped at a guest terminal, ready information is transmitted to all the player terminals 1 connected to the room. At each of the player terminals 1 that have received the ready information, a ready indication labeled as "OK" is superimposed on the player-information displaying part corresponding to the guest terminal at which the ready button has been tapped, as shown in FIG. 9B. Note that a ready indication has been displayed in the first player-information displaying part 54a since when the room was created. In this manner, with ready indications, it is possible to notify the other players that the player has no intent to change the participating characters.

Next, a battle game via multi-play will be described. Note that the basic content of the battle game is the same between multi-play and solo-play. Therefore, differences between multi-play and solo-play will be described here. In four-player play, the first participating character 40a is set as the operable character of the host player (first operable character), the second participating character 40b is set as the operable character of the first guest player (second operable character), the third participating character 40c is set as the operable character of the second guest player (third operable character), and the fourth participating character 40d is set as the operable character of the third guest player (fourth operable character).

In three-player play, the first operable character and the first non-operated character of the host player, the second operable character of the first guest player, and the third operable character of the second guest player are set individually as participating characters. At this time, the first operable character is set as the first participating character 40a, the first non-operated character is set as the second participating character 40b, the second operable character is set as the third participating character 40c, and the third operable character is set as the fourth participating character 40d. That is, in three-player play, an operable character and a non-operated character are registered in association with the host player.

In two-player play, the first operable character and the first non-operated character of the host player as well as the second operable character and the second non-operated character of the first guest player are registered individually as participating characters. At this time, the first operable character is set as the first participating character 40a, the first non-operated character is set as the second participating character 40b, the second operable character is set as the third participating character 40c, and the second non-operated character is set as the fourth participating character 40d. That is, in two-player play, an operable character and a non-operated character are registered in association with the host player, and an operable character and a non-operated character are registered in association with the guest player.

Furthermore, although not described in detail, multi-play is realized by communicatively connecting a plurality of player terminals 1. Since it is necessary to synchronize the plurality of player terminals 1, a player for whom communication is disconnected over a prescribed period cannot continue multi-play. In this case, the player for whom communication has been disconnected is isolated from multi-play and is switched to solo-play. At this time, the player terminal 1 switched to solo-play has stored therein information concerning the individual participating characters and information concerning the boss character, and the participating characters corresponding to the other players subsequently operate under computer control. That is, in the case where switching from multi-play to solo-play has occurred due to a communication disconnection, the participating characters corresponding to the other players are associated with the player at the player terminal 1 for which communication has been disconnected.

Meanwhile, even if a player leaves due to a communication disconnection, as described above, multi-play is continued among players for whom communication is established. In this case, the participating character corresponding to the player who has left is associated with one of the other players continuing multi-play. For example, suppose that, due to a communication disconnection, a player leaves from a battle game started with four-player play. In this case, the participating character associated with the player who has left is associated with the host player, and is subsequently subjected to computer control as a non-operated character of the host player. Alternatively, the participating character associated with the player who has left may be associated with another guest player instead of the host player.

Meanwhile, when the host player is what is called an advanced player, in the case where the room includes what is called a novice player, there are cases where the host player breaks up the room, considering that it is possible to increase the game clearing rate by forming a team among advanced players. Also, in the case where the room includes a novice player, there are cases where the host player breaks up the room, considering that it is possible to reduce the game clearing time by forming a team among advanced players. Here, the advanced player (first player) is, for example, a player who has already cleared the battle game that was set when the room was created (i.e., the battle game selected by the host player). Furthermore, the novice player (second player) is, for example, a player who has not yet cleared the battle game that was set when the room was created. Hereinafter, players who have already cleared the battle game that was set when the room was created will be referred to as advanced players, and players who have not yet cleared the battle game will be referred to as novice players.

Furthermore, there are cases where guest players also exit from (leave) the room in the case where a novice player is included in the room. In this case, the essence of the game, i.e., cooperative play by a plurality of players, is compromised.

Thus, in this embodiment, when an advanced player has cleared a specific battle game together with a novice player (i.e., a battle game not yet cleared by the novice player), an additional reward is given to the advanced player. Accordingly, by clearing a specific battle game together with a novice player, an advanced player can receive an additional reward that would not be acquired when the specific battle game were cleared by advanced players. This increases the motivation for advanced players to clear specific battle games together with novice players. Furthermore, novice players can increase the clearing rate of battle games not yet cleared by trying the battle games not yet cleared together with advanced players.

Figure 10A:
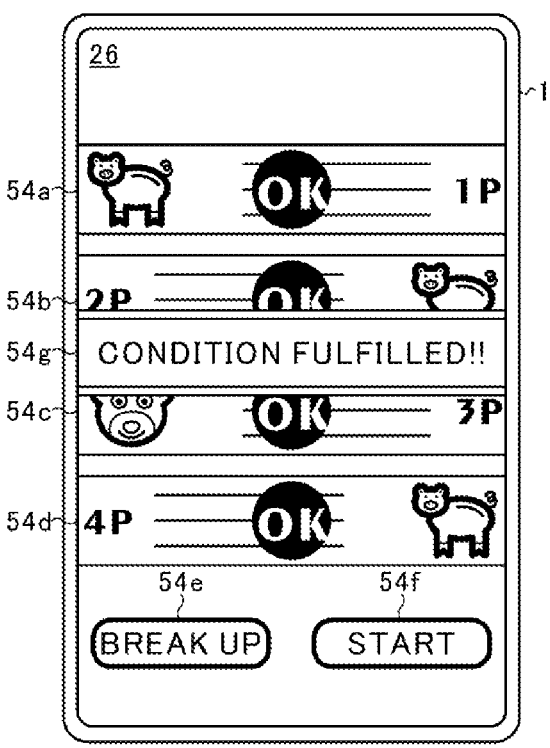
FIG. 10A is an illustration for explaining an example of the ready state of a room wait screen including an advanced player and a novice player.
Figure 10B:
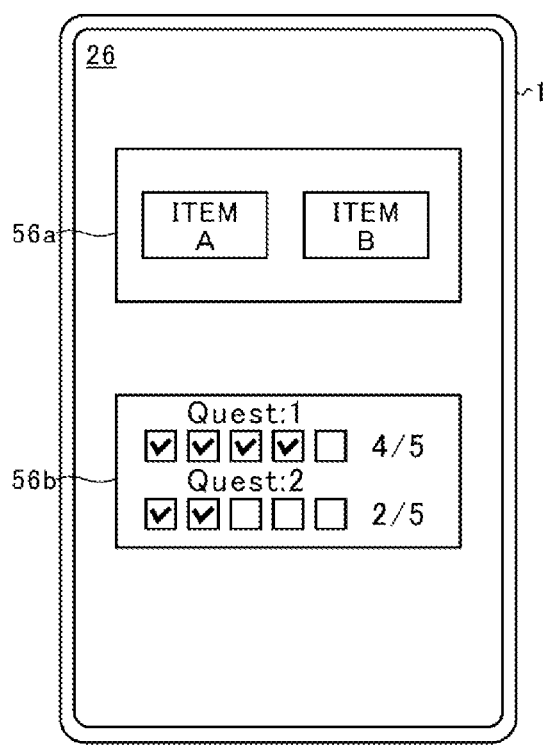
FIG. 10B is an illustration for explaining an example mission confirmation screen.

FIG. 10A is an illustration showing an example of the ready state of a room wait screen including an advanced player and a novice player. FIG. 10B is an illustration showing an example mission confirmation screen. As shown in FIG. 10A, in this embodiment, in the room wait screen of the advanced player, a notifying part 54g is displayed. The notifying part 54g is displayed only in the room wait screens of advanced players, i.e., players who have cleared the battle game that was set when the room was created. That is, the notifying part 54g is not displayed in the room wait screens of novice players, i.e., players who have not cleared the battle game that was set when the room was created.

Here, in the case where the room includes both an advanced player and a novice player, the server 100 determines that a condition for the advanced player to acquire an additional reward (hereinafter referred to as an additional-reward acquiring condition) is satisfied. Furthermore, in the case where the room does not include both an advanced player and a novice player, the server 100 determines that the additional-reward acquiring condition is not satisfied. In the case where the additional-reward acquiring condition is satisfied, the notifying part 54g is displayed in the room wait screen of the advanced player, and the notifying part 54g is not displayed in the room wait screen of the novice player. Furthermore, in the case where the additional-reward acquiring condition is not satisfied, the notifying part 54g is not displayed in the room wait screen of either the advanced player or the novice player.

As described above, the notifying part 54g is displayed only in the case where the room includes both an advanced player and a novice player. That is, the notifying part 54g is not displayed in the case where the room includes only advanced players or in the case where the room includes only novice players.

As shown in FIG. 10A, in the notifying part 54g, condition satisfaction information indicating that the additional-reward acquiring condition is satisfied is displayed. Here, in the first player-information displaying part 54a, the second player-information displaying part 54b, the third player-information displaying part 54c, and the fourth player-information displaying part 54d of the room wait screen, information as to whether each player corresponds to an advanced player or a novice player is not displayed. Thus, an advanced player has no means for checking whether or not the room includes a novice player, except the condition satisfaction information displayed in the notifying part 54g. Accordingly, until the notifying part 54g is displayed in the room wait screen, an advanced player guesses whether each player in the room corresponds to an advanced player or a novice player by checking the level and participating character of that player, the content of the equipment of the participating character, etc.

In this embodiment, the condition satisfaction information displayed in the notifying part 54g makes it possible for an advanced player to recognize that the room includes a novice player and that the advanced player can receive an additional reward by clearing the battle game together with the novice player included in the room. Alternatively, without limitation to the above, in the first player-information displaying part 54a, the second player-information displaying part 54b, the third player-information displaying part 54c, and the fourth player-information displaying part 54d of the room wait screen, information simply indicating whether each player corresponds to an advanced player or a novice player (e.g., an advanced mark or a novice mark) may be displayed. Furthermore, by not displaying the notifying part 54g for novice players, it is possible to alleviate the sense of unfairness as to not allowing novice players to acquire the additional reward. Furthermore, by displaying the notifying part 54g when the preparation of all the players (all the team members) in the room is complete, it is possible to reduce the bother that the notifying part 54g is frequently displayed in the case where the members in the room are frequently changed. Alternatively, the notifying part 54g may be displayed in the room wait screen before the preparation of all the players in the room is complete. In this case, an additional-reward-acquiring-condition check process for determining whether or not the additional-reward acquiring condition is satisfied at the timing when the players enter (are added in) the room.

Note that there is a limit to the number of assignments of additional rewards to each advanced player during a predefined certain period. That is, the additional reward has set therefor in advance an upper limit to the number of times that the additional reward can be assigned during a certain period. Therefore, an advanced player cannot acquire additional rewards beyond the upper limit of the number of assignments during the certain period. This makes it possible to alleviate the sense of unfairness as to not allowing novice players to acquire the additional reward. The upper limit to the number of assignments of additional rewards can be confirmed from the mission-confirmation operating part 33 shown in FIG. 4A.

When the mission-confirmation operating part 33 shown in FIG. 4A is tapped, the mission confirmation screen shown in FIG. 10B is displayed. Here, the mission-confirmation operating part 33 shown in FIG. 4A is displayed only for advanced players and are not displayed for novice players. Alternatively, the mission-confirmation operating part 33 may also be displayed for novice players. In the mission confirmation screen, an additional-reward displaying part 56a and a mission-status displaying part 56b are displayed. In the additional-reward displaying part 56a, information concerning the kinds and number of additional rewards is displayed. In FIG. 10B, as an example, "Item A" and "Item B" are displayed in the additional-information displaying part 56a as information concerning the kinds of additional rewards. As the additional rewards, a prescribed number of prescribed rewards set in advance are assigned. Alternatively, the kinds and number of additional rewards may be determined, for example, through lotteries.

In the mission-status displaying part 56b, the following items of information are displayed: information concerning the kind of specific battle game (quest) for which an additional reward is assigned; information concerning the upper limit to the number of assignments of additional rewards; information concerning the number of assignments of additional rewards; and information concerning the number of remaining assignments of additional rewards. In FIG. 10B, "Quest:1" and "Quest:2" are displayed in the mission-status displaying part 56b as the information concerning the kind of specific battle game.

Furthermore, in the mission-status displaying part 56b, "5" is displayed as the information concerning the upper limit to the number of assignments. Furthermore, in the mission-status displaying part 56b, as information concerning the number of assignments of additional rewards to the advanced player for "Quest:1", "4" and four checked boxes are displayed. Furthermore, in the mission-status displaying part 56b, as information concerning the number of assignments of additional rewards to the advanced player for "Quest:2", "2" and two checked boxes are displayed. Furthermore, in the mission-status displaying part 56b, as information concerning the remaining number of times that the advanced player can acquire an additional reward for "Quest:1", a box that is not checked is displayed. Furthermore, in the mission-status displaying part 56b, as information concerning the remaining number of times that the advanced player can acquire an additional reward for "Quest:2", three boxes that are not checked are displayed.

These items of information concerning the kinds and number of additional rewards, as well as information concerning the upper limit to the number of assignments, the number of assignments, and the number of remaining assignments are stored and managed at the server 100. The information concerning the number of assignments and the number of remaining assignments of additional rewards is associated with identification information (player ID) of each player, and is stored in the server 100 as a part of each item of player information. Note that the information concerning the number of assignments and the number of remaining assignments of additional rewards is reset by the server 100 at regular intervals.

As described above, an advanced player can confirm the kinds and number of additional rewards, an upper limit to the number of assignments, the number of assignments, and the number of remaining assignments by tapping the mission-confirmation operating part 33 shown in FIG. 4A to display the mission confirmation screen shown in FIG. 10B.

Figure 11A:
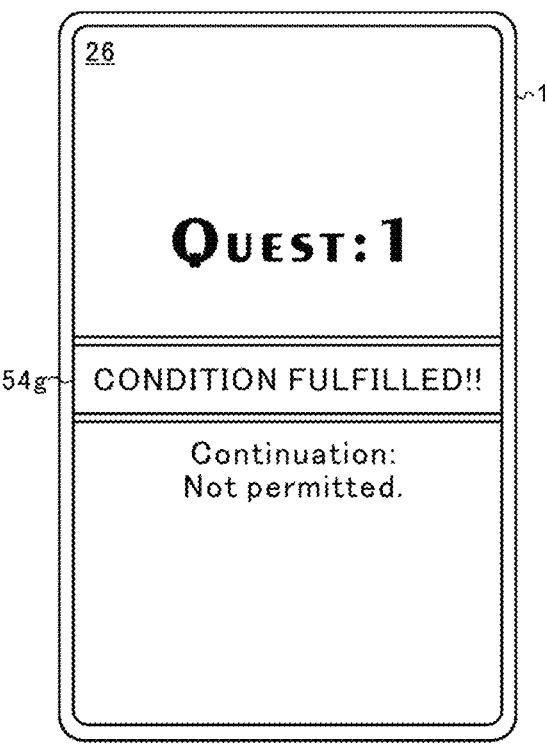
FIG. 11A is a first illustration for explaining an example notifying part at the start of a battle game via multi-play.
Figure 11B:
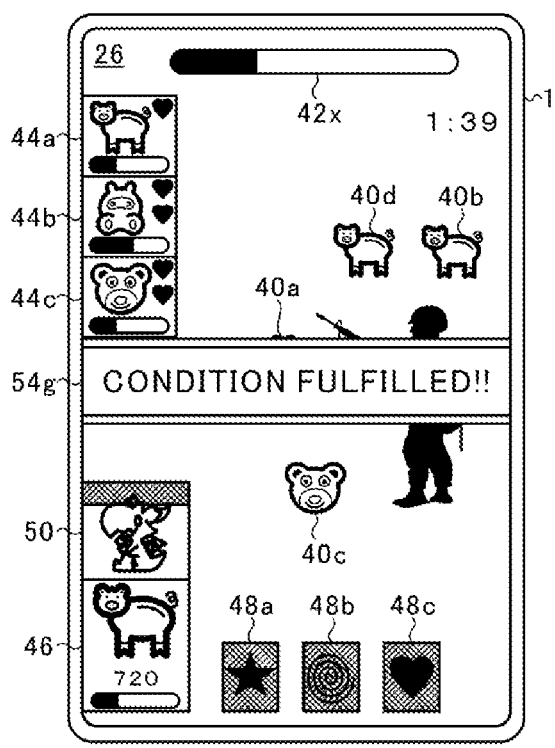
FIG. 11B is a second illustration for explaining an example notifying part during the battle game via multi-play.
Figure 11C:
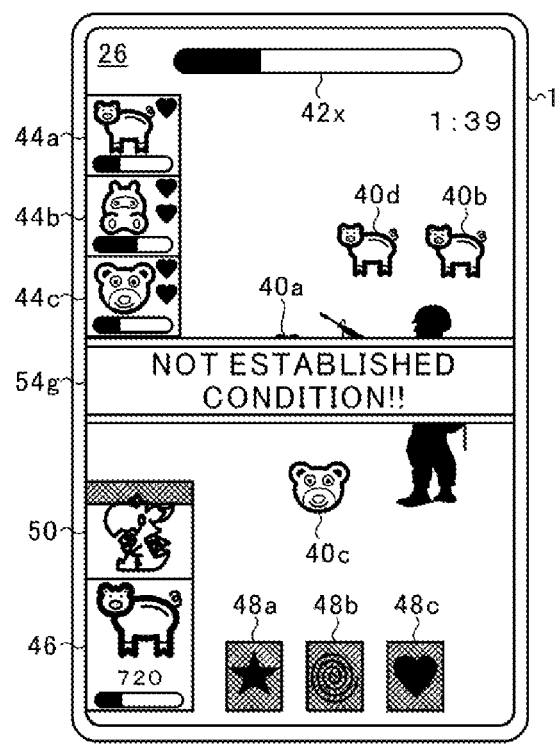
FIG. 11C is a third illustration for explaining an example notifying part during the battle game via multi-play.

FIG. 11A is a first illustration for explaining an example of the notifying part 54g at the start of a battle game via multi-play. FIG. 11B is a second illustration for explaining an example of the notifying part 54g during the battle game via multi-play. FIG. 11C is a third illustration for explaining an example of the notifying part 54g during the battle game via multi-play. At the player terminal 1 of an advanced player, in the case where the additional-reward acquiring condition is satisfied at the start of a battle game via multi-play, a notifying part 54g including condition satisfaction information indicating that the additional-reward acquiring condition is satisfied is displayed in the quest start screen, as shown in FIG. 11A. The notifying part 54g is displayed for a prescribed period from the start of the battle game. Alternatively, the notifying part 54g may be constantly displayed in the battle game screen from the start of the battle game to the end of the battle game, as shown in FIG. 11B. This makes it possible for an advanced player to recognize that the additional-reward acquiring condition is satisfied even after the start of the battle game, as well as before the start of the battle game.

Meanwhile, in the case where the additional-reward acquiring condition is not satisfied after the start of the battle game via multi-play, a notifying part 54g including condition non-satisfaction information indicating that the additional-reward acquiring condition is not satisfied is displayed in the quest start screen or the battle game screen, as shown in FIG. 11C. The notifying part 54g is displayed for a prescribed period from the timing when the additional-condition acquiring condition has become no longer satisfied. Alternatively, the notifying part 54g may be constantly displayed in the battle game screen until the end of the battle game after the additional-reward acquiring condition has become no longer satisfied, as shown in FIG. 11C. This makes it possible for an advanced player to recognize that the additional-reward acquiring condition has become no longer satisfied after the start of the battle game. Alternatively, the notifying part 54g may be displayed in the quest start screen, similarly to FIG. 11A, in the case where the additional-reward acquiring condition is not satisfied at the start of the battle game.

The functional configuration (functional units) of the information processing system S for executing the battle game described above, as well as processes carried out by the individual functional units, will be described below in detail.

(Functional Configuration of Information Processing System S)

Figure 12:
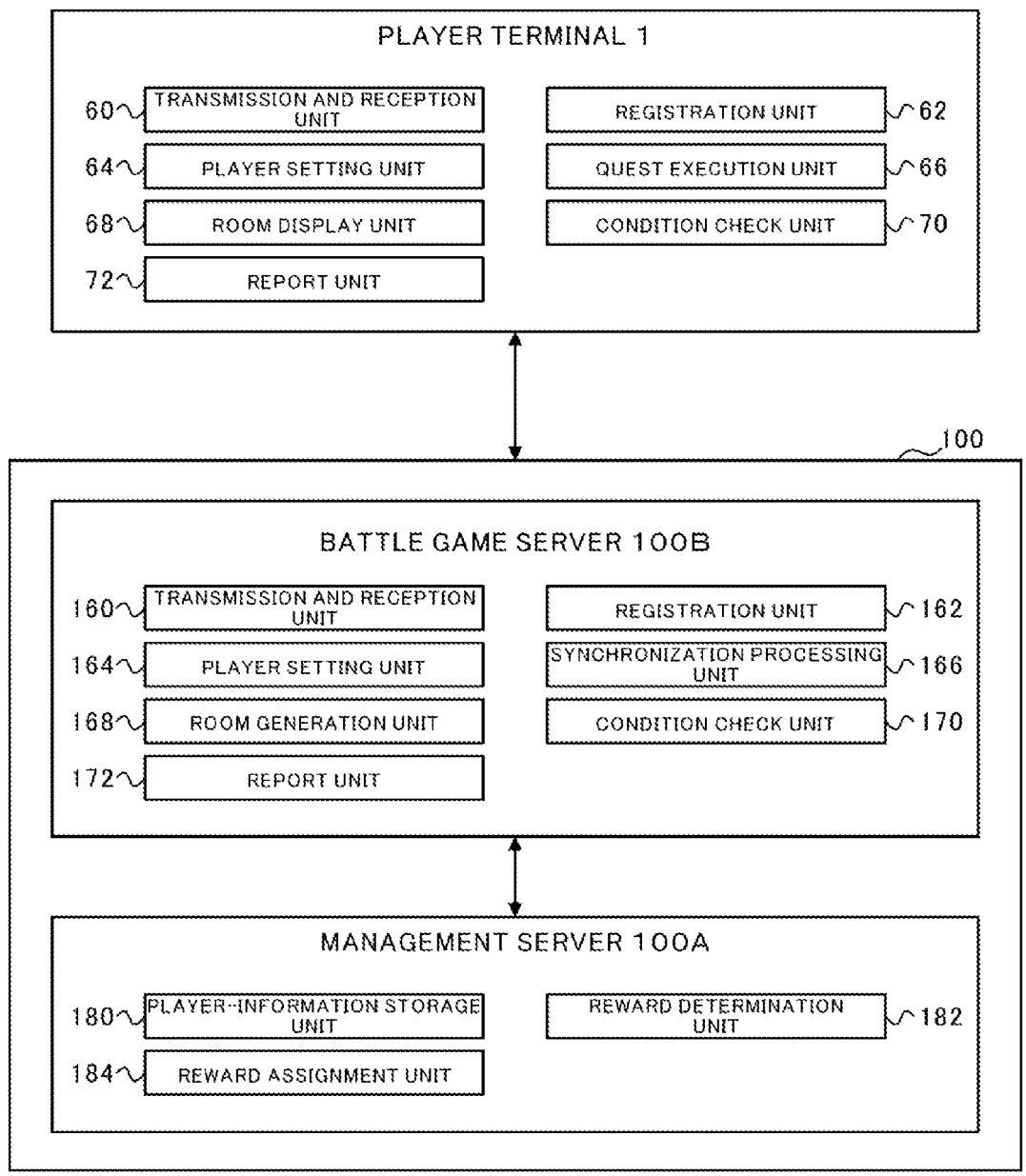
FIG. 12 is a diagram for explaining the functional configuration of the player terminal and the server.

FIG. 12 is a diagram for explaining the functional configurations of the player terminal 1 and the server 100. The memory 12 of the player terminal 1 stores programs for proceeding with games. The CPU 10 of the player terminal 1 runs the individual programs, thereby causing the player terminal 1 to function as a transmission and reception unit 60, a registration unit 62, a player setting unit 64, a quest execution unit 66 (game execution unit), a room display unit 68, a condition check unit 70, and a report unit 72.

Furthermore, the battle game server 100B runs the individual programs, thereby functioning as a transmission and reception unit 160, a registration unit 162, a player setting unit 164, a synchronization processing unit 166, a room generation unit 168 (team formation unit), a condition check unit 170, and a report unit 172. Furthermore, the management server 100A runs the individual programs, thereby functioning as a player-information storage unit 180, a reward determination unit 182, and a reward assignment unit 184.

Note that the functional units shown in FIG. 12 are merely examples, and a large number of other functional units are also provided. Furthermore, each of the functional units may be provided at any of the player terminal 1, the management server 100A, and the battle game server 100B. Furthermore, multiple functional units having the same role may be provided at the player terminal 1, the management server 100A, and the battle game server 100B.

The transmission and reception units 60 and 160 send and receive various kinds of information between the player terminal 1 and the server 100. Furthermore, the transmission and reception unit 160 sends and receives information among the player terminals 1 of a plurality of players participating in games.

The registration units 62 and 162, on the basis of a registration request operation input to the player terminal 1, registers an operable character that can be operated by the player as a participating character, and registers non-operated characters, which operate on the basis of computer control, as participating characters in the case where the number of registered operable characters is less than a prescribed number. That is, the registration units 62 and 162 register, as participating characters, a number of non-operated characters corresponding to the difference between the capacity and the number of registered operable characters. Furthermore, the registration unit 62 registers non-operated characters as participating characters also in the case where solo-play is executed.

The player setting units 64 and 164 associate each operable character with the player who can operate the operable characters, and associates each non-operated character with one of the players.

The quest execution unit 66, on the basis of operations input to the player terminal 1 during the battle game or on the basis of computer control, operates each participating character in the continuation enabled state, while disabling the operation of each participating character if that participating character is in the continuation disabled state. Furthermore, the quest execution unit 66 controls the proceeding of the battle game as a whole; for example, the quest execution unit 66 computes and updates the values of received damage, the HPs, and the various kinds of parameters of enemy characters and participating characters.

The room display unit 68 controls the displaying of the room selection screen and the room wait screen.

The condition check units 70 and 170 check, on the basis of the room information (player information), whether or not each of the players in the room (team) has cleared the battle game that was set when the room was created (the battle game selected by the host player). Furthermore, the condition check unit 170 checks whether or not the team includes both an advance player (first player) and a novice player (second player). The condition check unit 170 determines that the additional-reward acquiring condition is satisfied in the case where the team includes both an advanced player and a novice player, and determines that the additional-reward acquiring condition is not satisfied in the case where the team does not include both an advanced player and a novice player. The check concerning the additional-reward acquiring condition is executed when the room has entered the ready state before the start of the battle game, when the battle game is started, when the battle game is being played, when the players in the room have changed (left), when the battle game has been cleared, and so forth.

The report units 72 and 172 report condition satisfaction information to advanced players, indicating that the additional-reward acquiring condition is satisfied. Furthermore, the report units 72 and 172 report condition non-satisfaction information to advanced players, indicating that the additional-reward acquiring condition is not satisfied. Furthermore, the report units 72 and 172 report information concerning additional rewards to advanced players. The information concerning additional rewards include information concerning the kinds and number of additional rewards, as well as information concerning the upper limit to the number of assignments of additional rewards, the number of assignments, and the number of remaining assignments.

The synchronization processing unit 166 performs processing for synchronizing the player terminals 1 of a plurality of participating players during a battle game via multi-play.

The room generation unit 168 performs processing relating to room creation, room searching, matching, the entry of players into a room, etc. The room generation unit 168 functions as a team formation unit for forming a team that tries each battle game, constituted of a plurality of players.

The player-information storage unit 180 stores all the information relating to players in a storage unit as player information. Examples of the player information include information concerning possessed characters, party information, possessed item information, the number of quests cleared, player nicknames, and information concerning the number of assignments and the number of remaining assignments of additional rewards to the players. Furthermore, the player-information storage unit 180 resets the information concerning the number of assignments and the number of remaining assignments of additional rewards each time a predefined certain period elapses.

The reward determination unit 182 determines rewards to be assigned to the player in the case of a successful quest. Furthermore, in the case of a successful quest, the reward determination unit 182 determines additional rewards for each advanced player for whom the additional-reward acquiring condition is satisfied. A storage unit, which is not shown, stores information concerning additional rewards. For example, the storage unit stores information concerning the kinds and number of additional rewards, as well as information concerning an upper limit to the number of times that additional rewards can be assigned during a predefined certain period.

The reward assignment unit 184 assigns additional rewards to each advanced player when the battle game has been cleared by a plurality of players (team) formed by the room generation unit 168 and the additional-reward acquiring condition is satisfied.

Next, example processes of the information processing system S will be described. Here, the description will be directed first to example processes for realizing a battle game via solo-play, and then to example processes for realizing a battle game via multi-play.

(Processes of Information Processing System S, Relating to Solo-Play)

Figure 13:
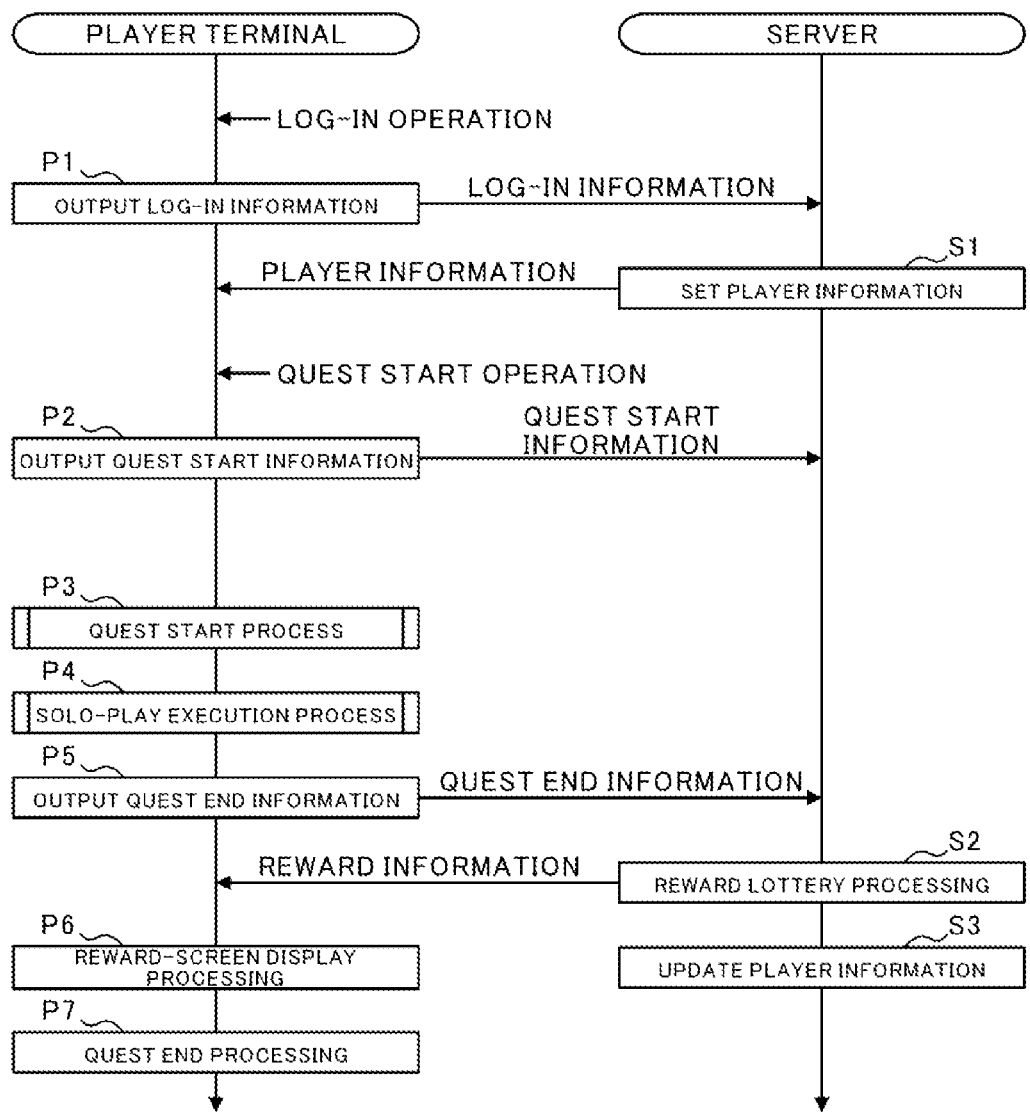
FIG. 13 is a sequence chart for explaining processes at the player terminal and the server, relating to solo-play.

FIG. 13 is a sequence chart for explaining processes at the player terminal 1 and the server 100, relating to solo-play. When a log-in operation is input to the player terminal 1, processing in which the transmission and reception unit 60 transmits log-in information to the server 100 is executed (P1). When the log-in information is received by the transmission and reception unit 160 of the server 100, various kinds of player information stored in association with the player ID are set (S1). The player terminal 1, upon receiving the player information from the server 100, displays a game image relating to an out-game on the display 26.

Then, after a quest is selected in the quest selection screen (see FIG. 4A), solo-play is selected as the play mode in the play-mode selection screen (see FIG. 4B), and when a quest start operation (tapping of the start button 36b) is input in the party selection screen (see FIG. 4C), quest start information is transmitted from the player terminal 1 to the server 100 (P2), and a quest start process (P3) is executed. The quest start information includes party information concerning the currently selected party and the type of quest selected.

Figure 14:
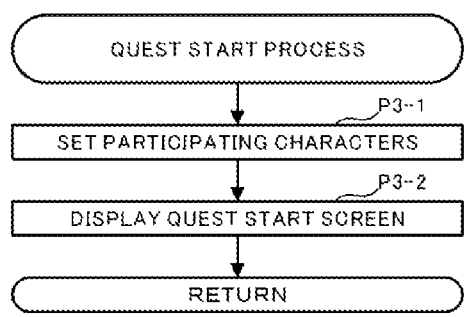
FIG. 14 is a flowchart for explaining a quest start process at the player terminal.

FIG. 14 is a flowchart for explaining the quest start process at the player terminal 1. In the quest start process, on the basis of the party information of the currently selected party, the registration unit 62 sets the first party forming character to the fourth party forming character as the first participating character 40a to the fourth participating character 40d, respectively (P3-1). Furthermore, here, the registration unit 62 sets the first party forming character as the operable character and sets the other party forming character as non-operated characters.

The quest execution unit 66 displays the quest start screen (see FIG. 5A) on the display 26 (P3-2). Referring back to FIG. 13, when the quest start process is finished, the quest execution unit 66 starts a solo-play execution process (P4).

Figure 15:
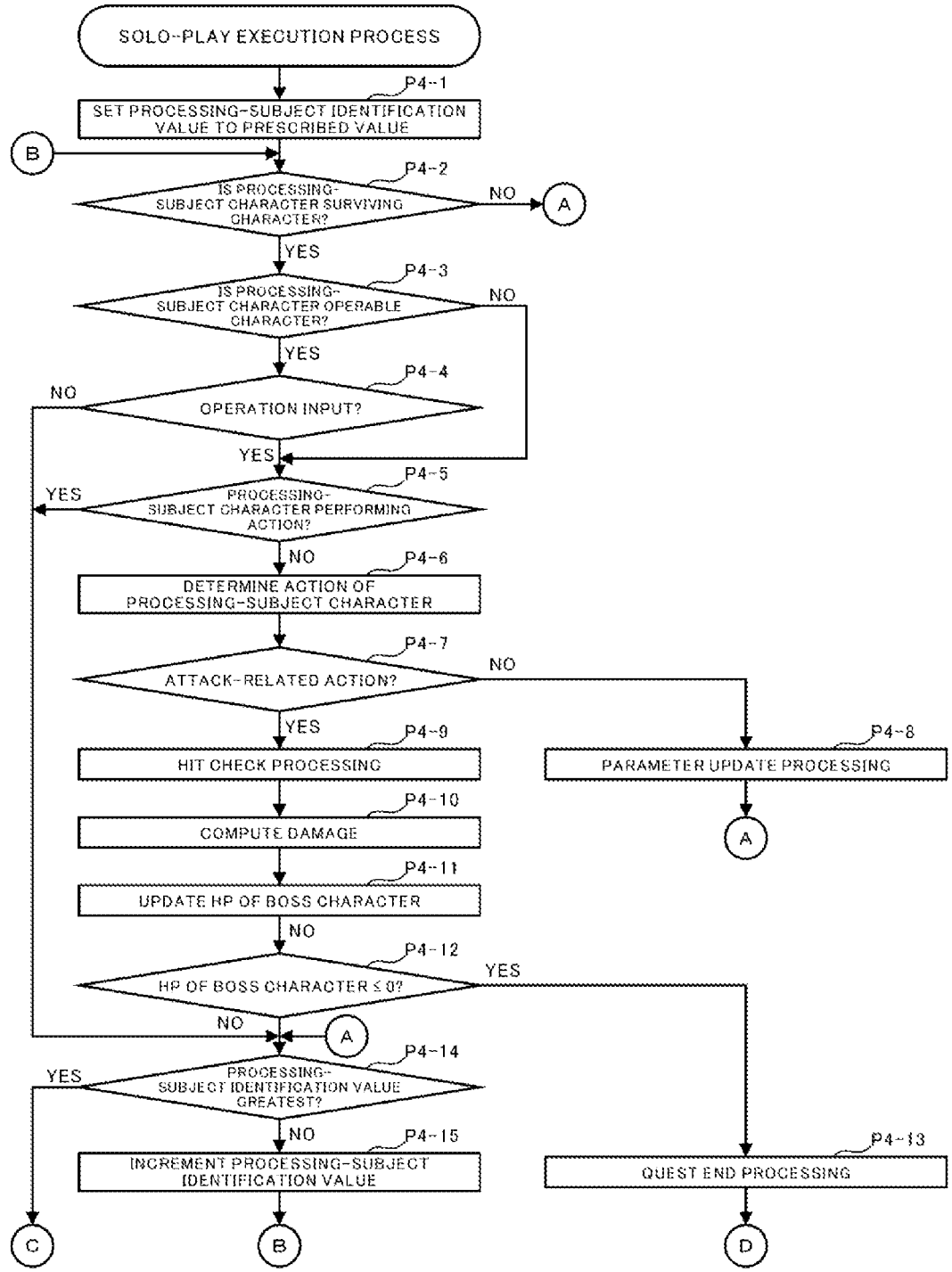
FIG. 15 is a first flowchart for explaining a solo-play execution process at the player terminal.
Figure 16:
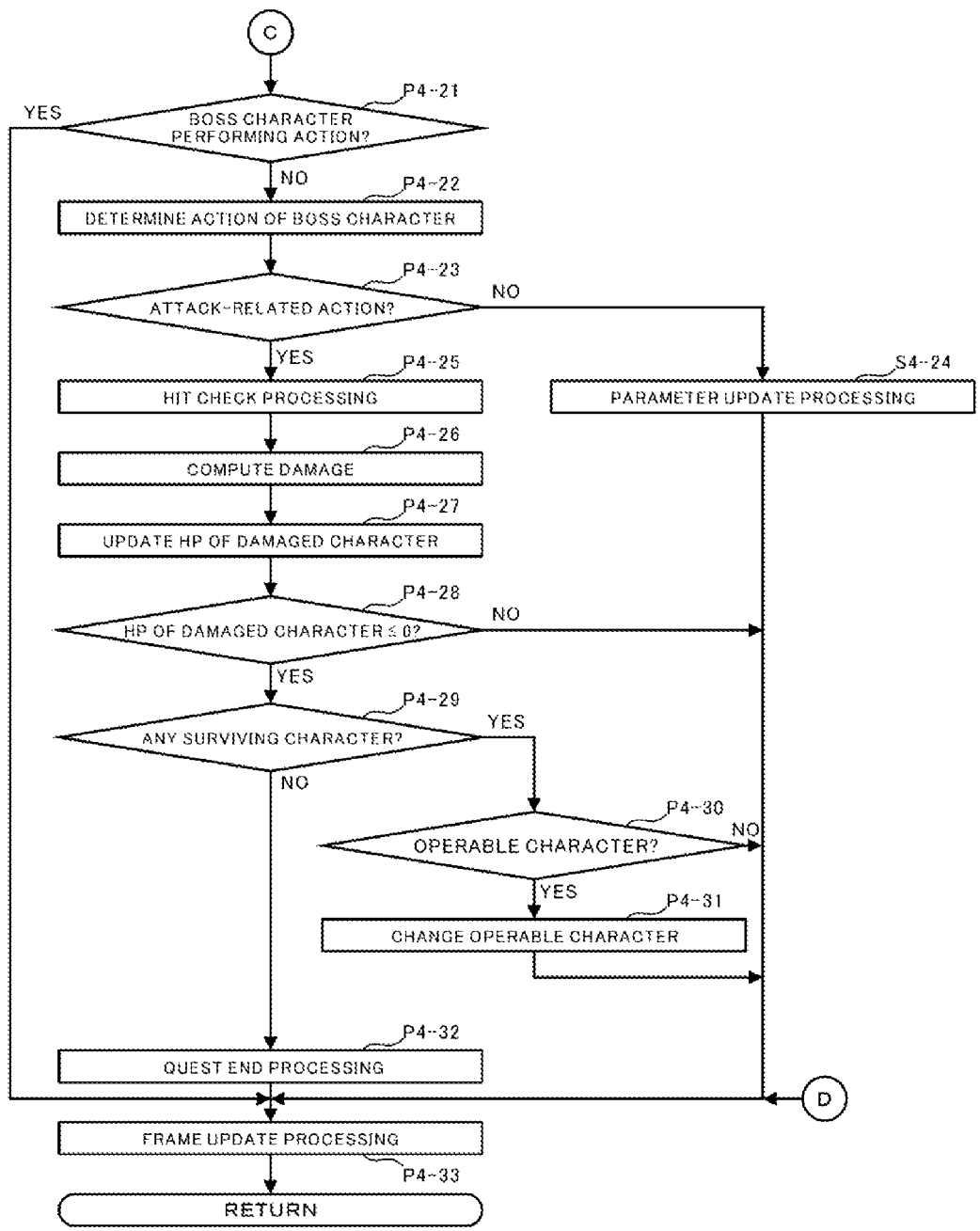
FIG. 16 is a second flowchart for explaining the solo-play execution process at the player terminal.

FIG. 15 is a first flowchart for explaining the solo-play execution process at the player terminal 1. FIG. 16 is a second flowchart for explaining the solo-play execution process at the player terminal 1. The solo-play execution process described below is executed repeatedly for individual frames (at image update intervals) of the player terminal 1 until solo-play is terminated. Furthermore, in the context of this embodiment, descriptions will be directed to processing relating to the boss character, while omitting descriptions of processing relating to enemy characters other than the boss character.

The quest execution unit 66 sets, as a prescribed value, a processing-subject identification value for identifying a participating character (P4-1). For example, four values, namely, 00H to 03H, are defined as processing-subject identification values, of which 00H corresponds to the first participating character 40a, 01H corresponds to the second participating character 40b, 02H corresponds to the third participating character 40c, and 03H corresponds to the fourth participating character 40d. Here, 00H is set as the prescribed value.

The quest execution unit 66 checks whether or not the processing-subject character (the participating character corresponding to the processing-subject identification value) is a surviving character (P4-2). Furthermore, in the case where the processing-subject character is not surviving (NO in P4-2), it is checked whether or not the processing-subject identification value is the greatest (03H here) (P4-14). If the processing-subject identification value is the greatest (YES in P4-14), i.e., if the processing for all the participating characters has been finished, the process proceeds to P4-21, which will be described later. That is, if the processing-subject identification value is not the greatest (NO in P4-14), i.e., if the processing for all the participating characters has not been finished, the processing-subject identification value is incremented (P4-15), and the process is repeated from P4-2.

If the processing-subject character is surviving (YES in P4-2), it is checked whether or not the processing-subject character is an operable character (P4-3). If the processing-subject character is an operable character (YES in P4-3), it is checked whether or not an operation has been input at the player terminal 1 (P4-4). If no operation has been input (NO in P4-4), the process proceeds to P4-14. Meanwhile, in the case where the processing-subject character is an operable character and an operation has been input (YES in P4-4), and in the case where the processing-subject character is a non-operated character (NO in P4-3), it is checked whether or not the processing-subject character is performing an action (P4-5). If the processing-subject character is performing an action (YES in P4-5), the process proceeds to P4-14.

Meanwhile, if the processing-subject character is not performing an action (NO in P4-5), the quest execution unit 66 determines an action of the processing-subject character (P4-6). For example, if the processing-subject character is an operable character, an attacking action, a moving action, the use of a skill, dragonization, or the like of the processing-subject character is determined on the basis of an input operation. Furthermore, for example, if the processing-subject character is a non-operated character, an attacking action, a moving action, the use of a skill, or the like of the processing-subject character is determined on the basis of a prescribed action program for non-operated characters. The quest execution unit 66 checks whether or not the determined action is an attack-related action (P4-7).

If the determined action is not an attack-related action (NO in P4-7), various kinds of parameters are updated as needed (P4-8), and the process proceeds to P4-14. Note that attack-related actions include the use of a skill that gives damage to the boss character, in addition to attacking actions. In the case where an attack-related action is determined (YES in P4-7), the quest execution unit 66 performs hit check processing for checking whether the attack has hit the boss character (P4-9), computes the damage given to the boss character (P4-10), and updates the HP of the boss character by subtracting the computed damage from the HP of the boss character (P4-11). The quest execution unit 66 checks whether or not the updated HP of the boss character is less than or equal to zero (P4-12).

Then, if the HP of the boss character is not less than or equal to zero (NO in P4-12), the process proceeds to P4-14. Meanwhile, if the HP of the boss character is less than or equal to zero (YES in P4-12), quest end processing for finishing the quest is performed (P4-13). In the quest end processing, quest end information indicating that the quest has been finished is set.

When the processing for all the participating characters is finished (YES in P4-14), the quest execution unit 66 checks whether or not the boss character is performing an action (P4-21), as shown in FIG. 16. If the boss character is performing an action (YES in P4-21), the game screen, i.e., the frame, of the display 26 is updated (P4-33), and the solo-play execution process is finished. If the boss character is not performing an action (NO in P4-21), an action of the boss character is determined on the basis of a prescribed action program for the boss character (P4-22). The quest execution unit 66 checks whether or not the determined action is an attack-related action (P4-23).

If the determined action is not an attack-related action (NO in P4-23), various kinds of parameters are updated as needed (P4-24), and the process proceeds to P4-33. Note that attack-related actions include special attacking actions that give damage to participating characters, in addition to normal attacking actions. In the case where an attack-related action is determined (YES in P4-23), the quest execution unit 66 performs hit check processing for checking whether or not the attack has hit a participating character (P4-25), computes the damage given to the participating character (P4-26), and updates the HP of the participating character hit by the attack (damaged character) by subtracting the computed damage from the HP of the damaged character (P4-27). Note that an attack may simultaneously hit a plurality of participating characters. In this case, subtraction from the HPs of the plurality of damaged characters is performed. The quest execution unit 66 checks whether or not the updated HP of the damaged character (participating character) is less than or equal to zero (P4-28).

If the HP of the damaged character is not less than or equal to zero (NO in P4-28), the process proceeds to P4-33. Meanwhile, the HP of the damaged character is less than or equal to zero (YES in P4-28), it is checked whether or not there is any surviving character among the participating characters (P4-29). If there is no surviving character (NO in P4-29), it is determined that all the participating characters participating in the battle game have been annihilated, and quest end processing for finishing the quest is performed (P4-32). In the quest end processing, quest end information indicating that the quest has been finished is set.

Meanwhile, in the case where there is any surviving character (YES in P4-29), it is checked whether or not the damaged character whose HP has become less than or equal to zero is an operable character (P4-30). In the case where the HP of the operable character is less than or equal to zero (YES in P4-30), the operable character is changed (P4-31), and the process proceeds to P4-33. In the case where the HP of the operable character is not less than or equal to zero, the process proceeds to P4-33.

(Processes of Information Processing System S, Relating to Multi-Play)

Figure 17:
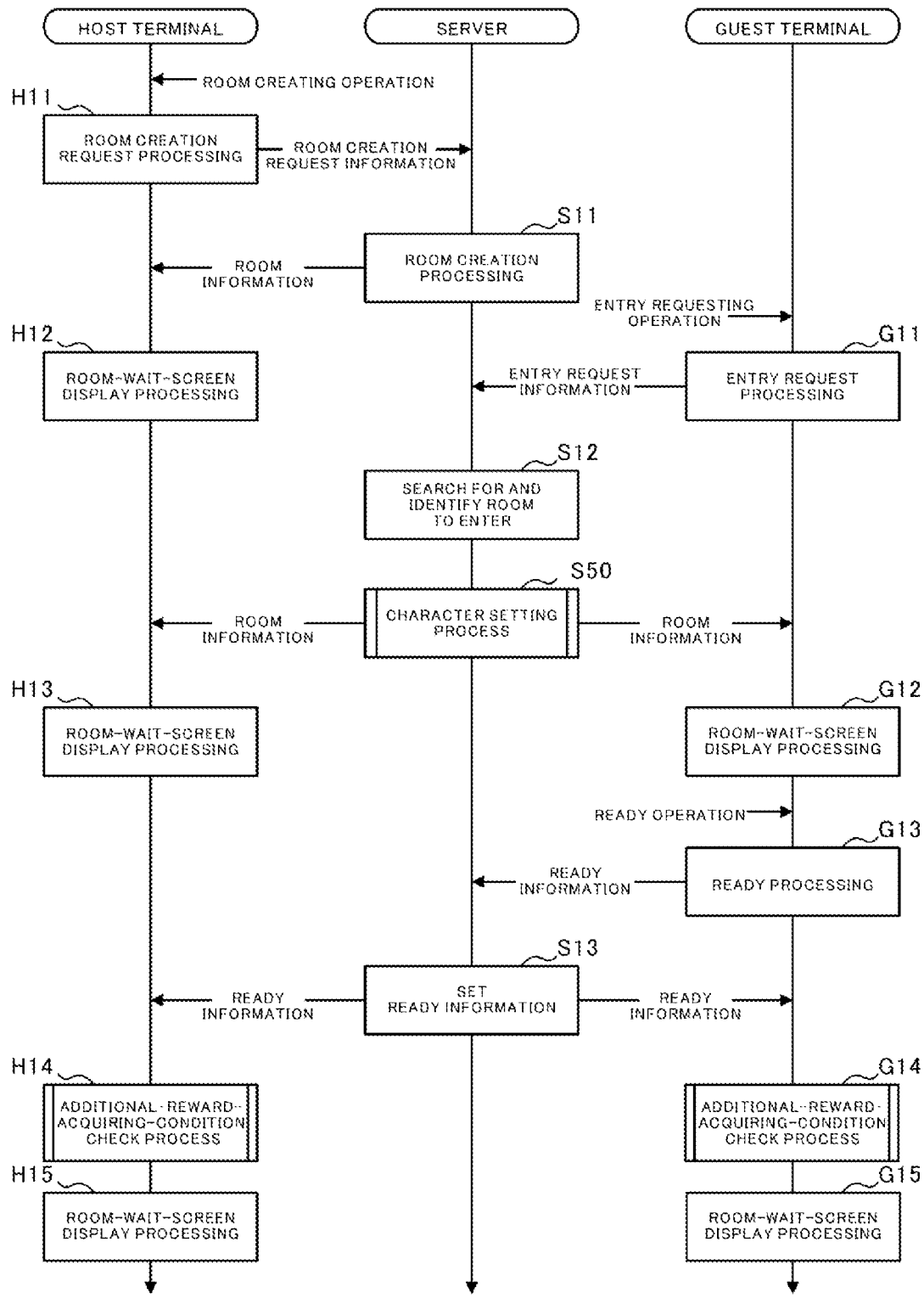
FIG. 17 is a first sequence chart for explaining processes at the player terminal and the server, relating to multi-play.
Figure 18:
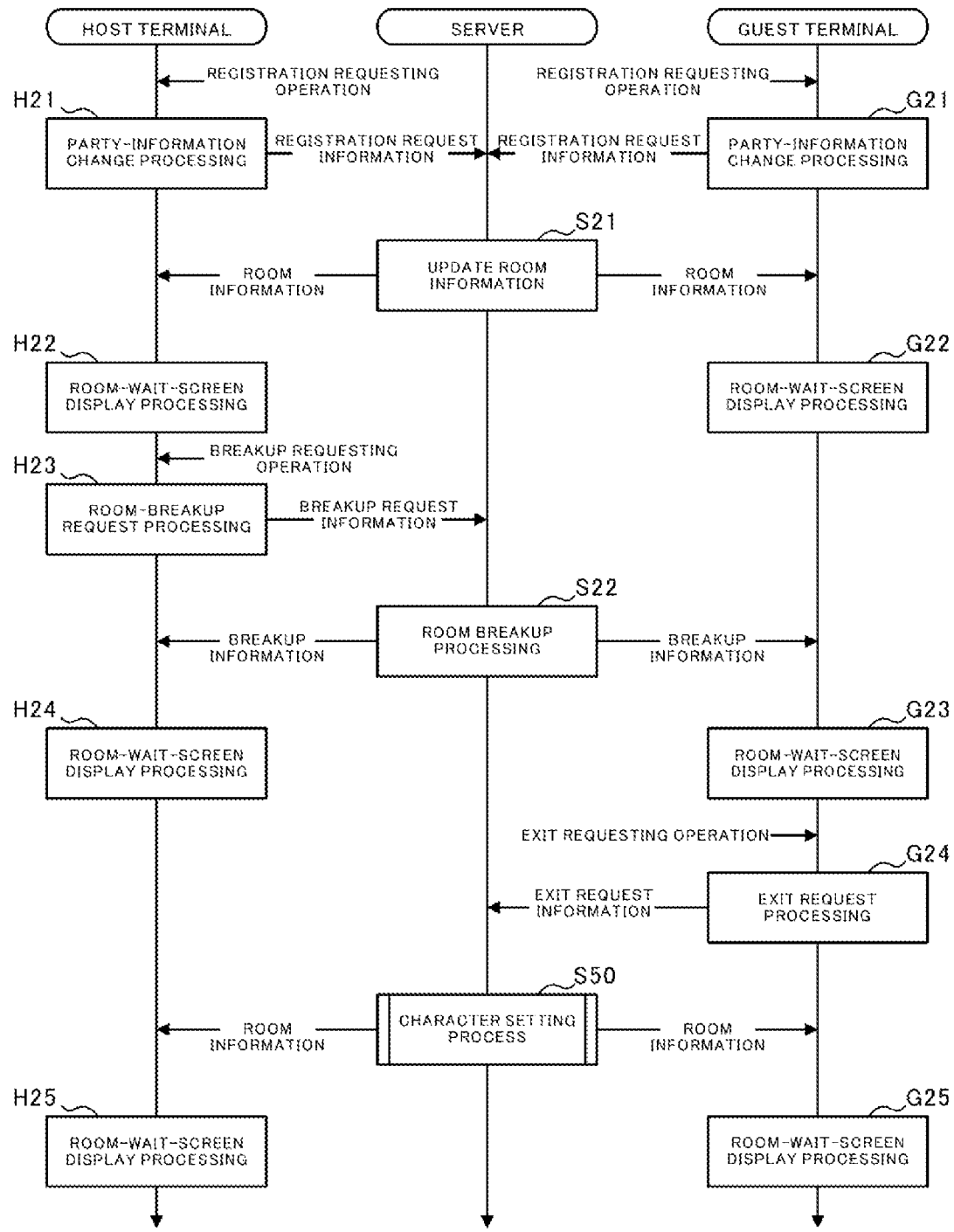
FIG. 18 is a second sequence chart for explaining processes at the player terminal and the server, relating to multi-play.
Figure 19:
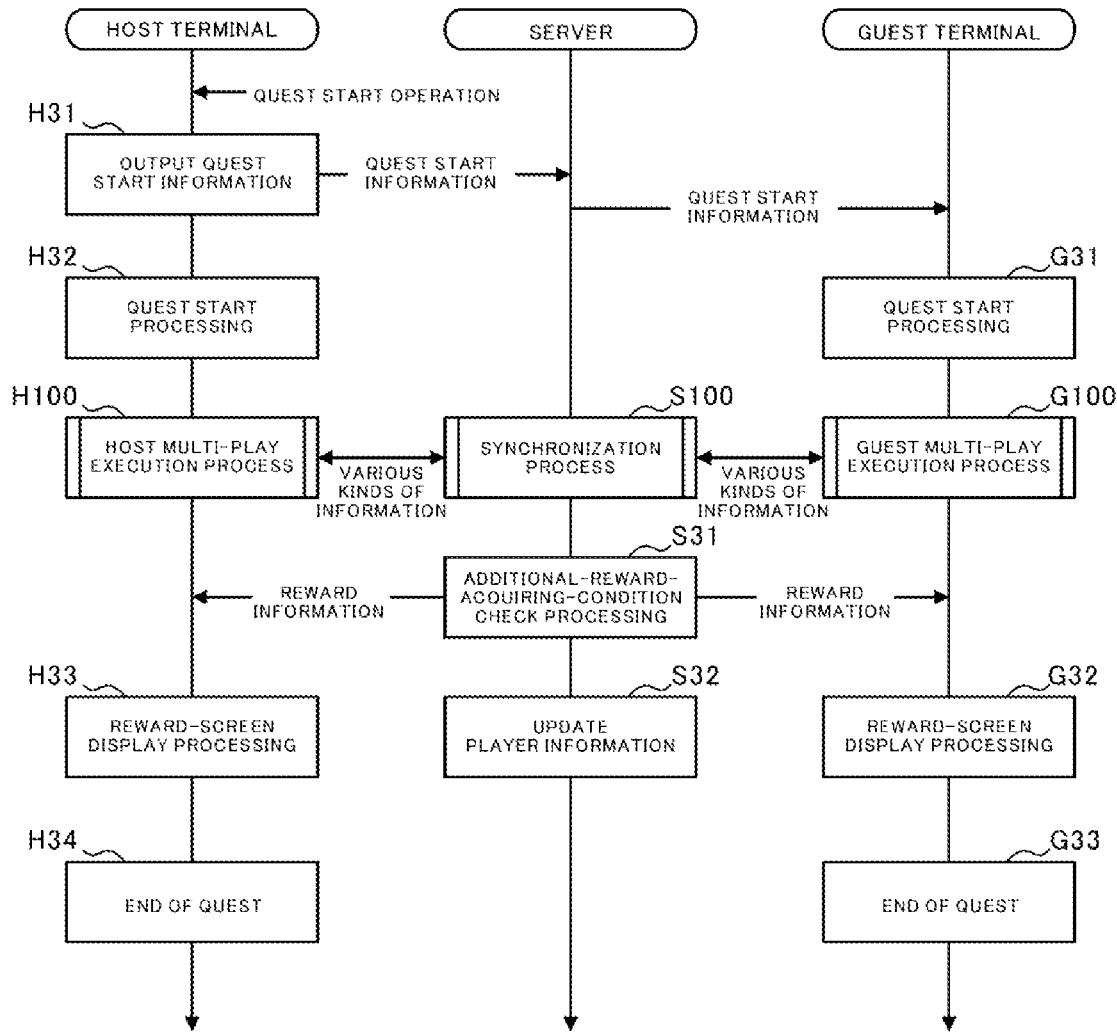
FIG. 19 is a third sequence chart for explaining processes at the player terminal and the server, relating to multi-play.

FIG. 17 is a first sequence chart for explaining processes at the player terminal 1 and the server 100, relating to multi-play. FIG. 18 is a second sequence chart for explaining processes at the player terminal 1 and the server 100, relating to multi-play. FIG. 19 is a third sequence chart for explaining processes at the player terminal 1 and the server 100, relating to multi-play. When a room creating operation (tapping of the room creating button 52a) is input to the player terminal 1 (host terminal) via the room selection screen (see FIG. 8A), room creation request processing, in which the transmission and reception unit 60 transmits room creation request information to the server 100, is executed (H11). The room creation request information includes the type of quest selected by the host player, party information, player information, terminal information, etc.

When the room creation request information has been received by the transmission and reception unit 160 of the server 100, the room generation unit 168 executes room creation processing for creating a room at the battle game server 100B (S11). Furthermore, here, the registration unit 162 registers the player information, and registers the first party forming character as the first participating character 40a and the operable character on the basis of the party information. Furthermore, the player setting unit 164 stores participating character and the host player in association with each other.

When a room has been created, the host terminal receives room information concerning the room. At the host terminal, room-wait-screen display processing, in which the room display unit 68 displays the room wait screen, is executed on the basis of the received room information (H12).

Furthermore, when an entry request operation (tapping of the room searching button 52b) is input at a player terminal 1 (guest terminal) that is different from the host terminal, entry request processing, in which the transmission and reception unit 60 transmits entry request information to the server 100, is executed (G11). The entry request information includes the type of quest selected by the guest player, party information, player information, terminal information, etc.

When the entry request information has been received by the transmission and reception unit 160 of the server 100, the room generation unit 168 searches for and identifies a room that has been created at the battle game server 100B, whose conditions match the entry request information, and that is not full. When such a room has been identified, a character setting process (S50) is executed.

Figure 20:
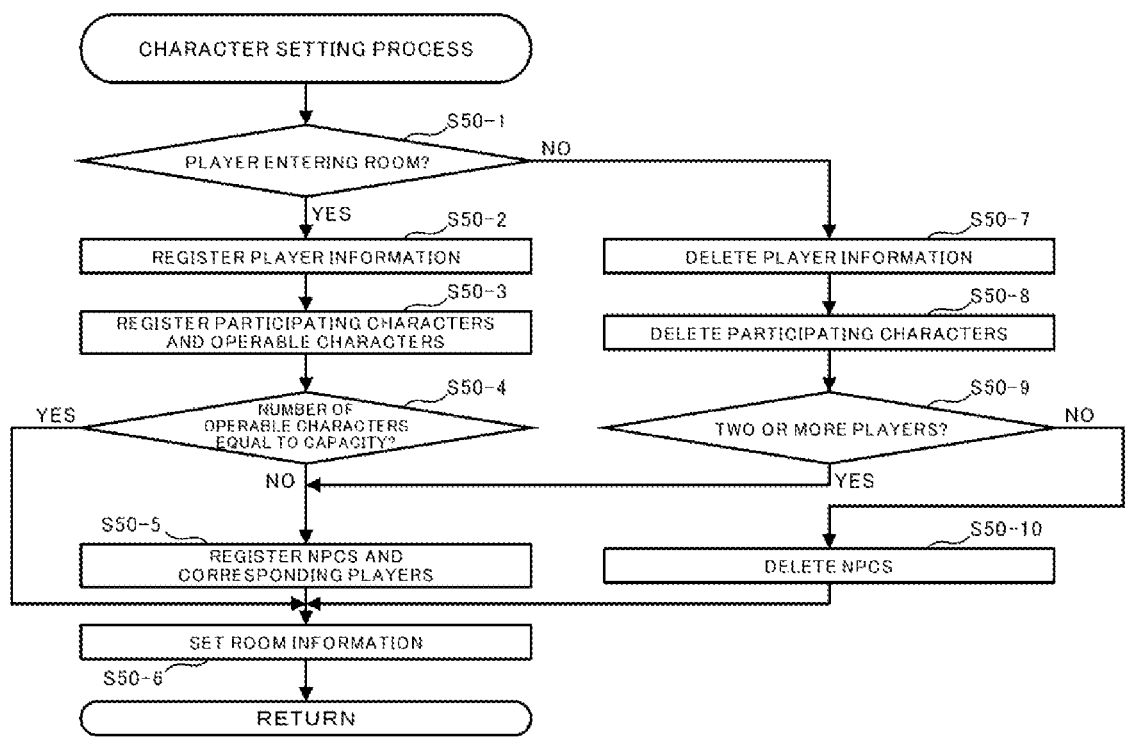
FIG. 20 is a flowchart for explaining a character setting process at the server.

FIG. 20 is a flowchart for explaining the character setting process at the server 100. The character setting process is executed by calling a module that is shared between the entry and the exit of a player. The registration unit 162 checks whether a player has entered the room or has exited from the room (S50-1). When a player has entered the room (YES in S50-1), the registration unit 162 registers the player information (S50-2), and registers the first party forming character as a participating character and the operable character on the basis of the party information (S50-3). Furthermore, here, the player setting unit 164 stores the operable character and the guest player in association with each other.

The registration unit 162 checks whether or not the number of operable characters is equal to the capacity (S50-4). Then, if the number of operable characters is equal to the capacity (YES in S50-4), the updated room information is set (S50-6). Meanwhile, if the number of operable characters is not equal to the capacity (NO in S50-4), the registration unit 162 registers an NPC (non-operated character) on the basis of the party information of the host player or the guest player, and the player setting unit 164 stores the NPC and one of the players in association with each other (S50-5). The updated room information is set also in the case where an NPC has been registered (S50-6).

Furthermore, if a player has exited from the room (NO in S50-1), the registration unit 162 deletes the player information (S50-7), and deletes the participating character corresponding to the player who has exited (S50-8). The registration unit 162 checks whether or not two or more players are present in the room (S50-9). If two or more players are remaining in the room (YES in S50-9), the process proceeds to S50-5. If two or more players are not remaining in the room (NO in S50-9), the registered NPC is deleted (S50-10). The updated room information is set also in the case where the NPC has been deleted (S50-6).

Referring back to FIG. 17, the room information set at the server 100 is received both at the host terminal and each guest terminal. At the host terminal and each guest terminal, room-wait-screen display processing, in which the room display unit 68 displays the room wait screen, is executed on the basis of the received room information (H13 and G12).

Furthermore, when a ready operation (tapping of the ready button) is input at a guest terminal, ready processing, in which ready information is transmitted from the guest terminal to the server 100, is executed (G13). The ready information transmitted to the server 100 is set in the server 100 so that the ready information can be received by all the player terminals 1 connected to the room (S13).

At the player terminal 1 that has received the ready information, the condition check unit 70 executes an additional-reward-acquiring-condition check process for checking whether or not the additional-reward acquiring condition is satisfied (H14 and G14). The additional-reward-acquiring-condition check processing that is executed at the host terminal and the additional-reward-acquiring-condition check process that is executed at the guest terminal are the same. Thus, the following description will be directed to the additional-reward-acquiring-condition check process that is executed at the host terminal, and a description of the additional-reward-acquiring-condition check process that is executed at the guest terminal will be omitted.

Figure 21:
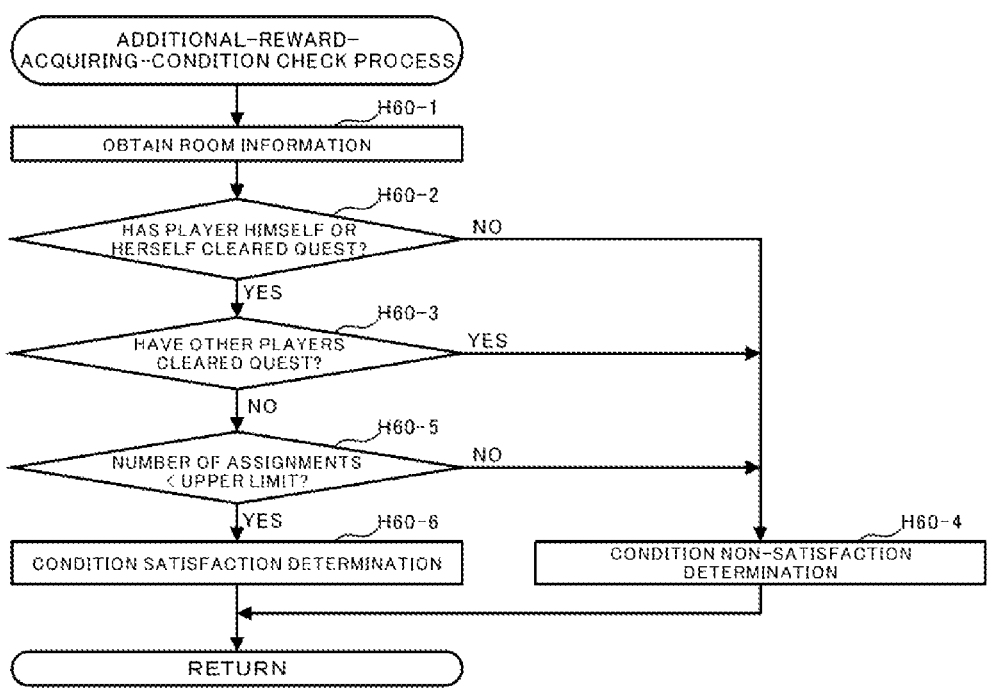
FIG. 21 is a flowchart for explaining an additional-reward-acquiring-condition check process at a host terminal.

FIG. 21 is a flowchart for explaining the additional-reward-acquiring-condition check process at the host terminal. As shown in FIG. 21, the condition check unit 70 obtains room information (the type information of the quest selected by the host player and the player information of each of the players in the room) (H60-1). The condition check unit 70 checks whether or not the host player (i.e., the player himself or herself) has cleared the quest selected by the host player (i.e., the specific battle game that was set when the room was created) (H60-2).

If the player himself or herself has cleared the quest (YES in H60-2), it is checked whether or not the other players in the room have cleared the quest selected by the host player (H60-3). Meanwhile, if the player himself or herself has not cleared the quest (NO in H60-2), it is determined that the additional-reward acquiring condition is not satisfied (a condition non-satisfaction determination) (H60-4), and the additional-reward-acquiring-condition check process is finished.

If there is any player who has not cleared the quest among the other players in the room (NO in H60-3), the number of assignments of additional rewards to the player himself or herself is obtained from the player information of the player himself or herself, and it is checked whether or not the number of assignments is less than the upper limit of the number of assignments (H60-5). Meanwhile, if there is no player who has not cleared the quest among the other players in the room (YES in H60-3), the process proceeds to H60-4, and the additional-reward-acquiring-condition check process is finished.

If the number of assignments is less than the upper limit of the number of assignments (YES in H60-5), it is determined that the additional-reward acquiring condition is satisfied (a condition satisfaction determination) (H60-6), and the additional-reward-acquiring-condition check process is finished. Meanwhile, if the number of assignments is not less than the upper limit of the number of assignments (NO in H60-5), the process proceeds to H60-4, and the additional-reward-acquiring-condition check process is finished.

Referring back to FIG. 17, at the player terminal 1 that has received the ready information, the room display unit 68 superimposes a ready indication (see FIG. 9B) on the player-information displaying part corresponding to the guest terminal at which the ready button has been tapped.

Furthermore, at the player terminal 1 at which it is determined that the additional-reward acquiring condition is satisfied, the report unit 72 executes room-wait-screen display processing, in which the notifying part 54g (see FIG. 10A) is superimposed on the room wait screen (H15 and G15).

Furthermore, the player can change the participating character (operable character) by inputting a registration request operation to the player terminal 1 in the room wait screen. As shown in FIG. 18, when a registration request operation is input at the host terminal or a guest terminal, party-information change processing (H21 and G21) is executed at each terminal. In the party-information change processing, the registration unit 62 changes the currently selected party, and transmits the changed party information to the server 100 as registration request information. At the server 100, on the basis of the received registration request information, the registration unit 162 registers participating characters, operable characters, non-operated characters, etc. to update the room information (S21).

When the room information has been updated, each of the host terminal and the guest terminals receive the updated room information, and executes room-wait-screen display processing, in which the room display unit 68 updates the room wait screen on the basis of the received room information (H22 and G22).

Furthermore, when a breakup request operation (tapping of the breakup button 54e) is input at the host terminal, room breakup request processing, in which breakup request information is transmitted from the host terminal to the server 100, is executed (H23). At the server 100, upon receiving the breakup request information, the room generation unit 168 executes room breakup processing for breaking up the room (S22). When the room breakup processing has been executed, each of the host terminal and the guest terminals receive breakup information, and the room display unit 68 executes room-wait-screen display processing for updating and displaying the room wait screen (H24 and G23).

Furthermore, when an exit request operation (tapping of the exit button) is input at a guest terminal that has entered the room, exit request processing, in which exit request information is transmitted from the guest terminal to the server 100, is executed (G24). At the server 100, upon receiving the exit request information, the character setting process (S50) described earlier is executed. Then, at each of the host terminal and the guest terminals, the updated room information is received, and room-wait-screen display processing, in which the room display unit 68 updates and displays the room wait screen, is executed on the basis of the received room information (H25 and G25).

Furthermore, as shown in FIG. 19, when a quest start operation (tapping of the start button 54f) is input at the host terminal, quest start information is transmitted from the player terminal 1 to the server 100 (H31), and a quest start process (H32 and G31) is executed. In the quest start processing relating to multi-play, the same processing as in the quest start processing relating to solo-play (FIG. 14), described earlier, is executed.

Then, a host multi-play execution process (H100) is started at the host terminal, a guest multi-play execution process (G100) is started at each of the guest terminal, and a synchronization process (S100) is executed at the server 100. In order to facilitate understanding, detailed descriptions will be given in order of the synchronization process (S100), the guest multi-play execution process (G100), and the host multi-play execution process (H100).

Figure 22:
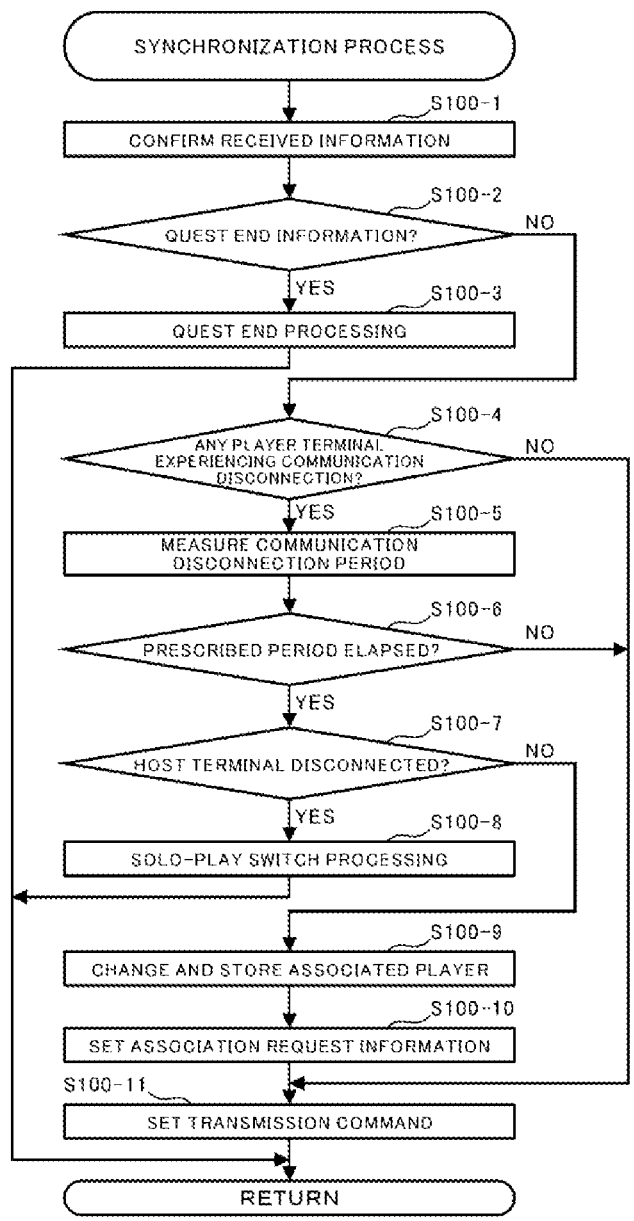
FIG. 22 is a flowchart for explaining a synchronization process at the server.

FIG. 22 is a flowchart for explaining the synchronization process at the server 100. The synchronization processing unit 166 confirms information received from the player terminals 1 connected to the room (S100-1). The synchronization processing unit 166 checks whether or not the received information is quest end information (S100-2). Upon receiving quest end information (YES in S100-2), quest end processing (S100-3) is executed. Meanwhile, in the case where quest end information has not been received (NO in S100-2), the synchronization processing unit 166 checks whether or not there is any player terminal 1 for which communication is currently disconnected among the player terminals 1 connected to the room (S100-4). If there is any player terminal 1 for which communication is currently disconnected (YES in S100-4), the communication disconnection period is measured (S100-5), and it is checked whether or not a prescribed period has elapsed (S100-6). In the case where the prescribed period has elapsed (YES in S100-6), it is checked whether or not the player terminal 1 experiencing a communication disconnection is the host terminal (S100-7).

In the case where the host terminal is experiencing a communication disconnection (YES in S100-7), the synchronization processing unit 166 executes solo-play switching processing for switching from multi-play to solo-play for all the player terminals 1 (S100-8). Meanwhile, in the case where a gust terminal is experiencing a communication disconnection (NO in S100-7), the player setting unit 164 stores the participating character corresponding to the player experiencing the communication disconnection, in association with another player (S100-9). Then, the player setting unit 164 sets association request information indicating a change in the corresponding relationships between participating characters and players (S100-10).

Furthermore, the synchronization processing unit 166 sets a transmission command so that the information received from the player terminal 1 will be received by prescribed player terminals 1 (S100-11). Here, the position information of the participating character, dragonization information indicating dragonization, and skill information indicating the use of a skill, received from the player terminal 1, are set to all the player terminals 1. Furthermore, information concerning damage given to the participating character and information concerning damage given to enemy characters are set to the host terminal. Note that the destination of transmission of each item of information is merely an example, and the player terminal 1 that transmits and receives each item of information can be set as appropriate.

Figure 23:
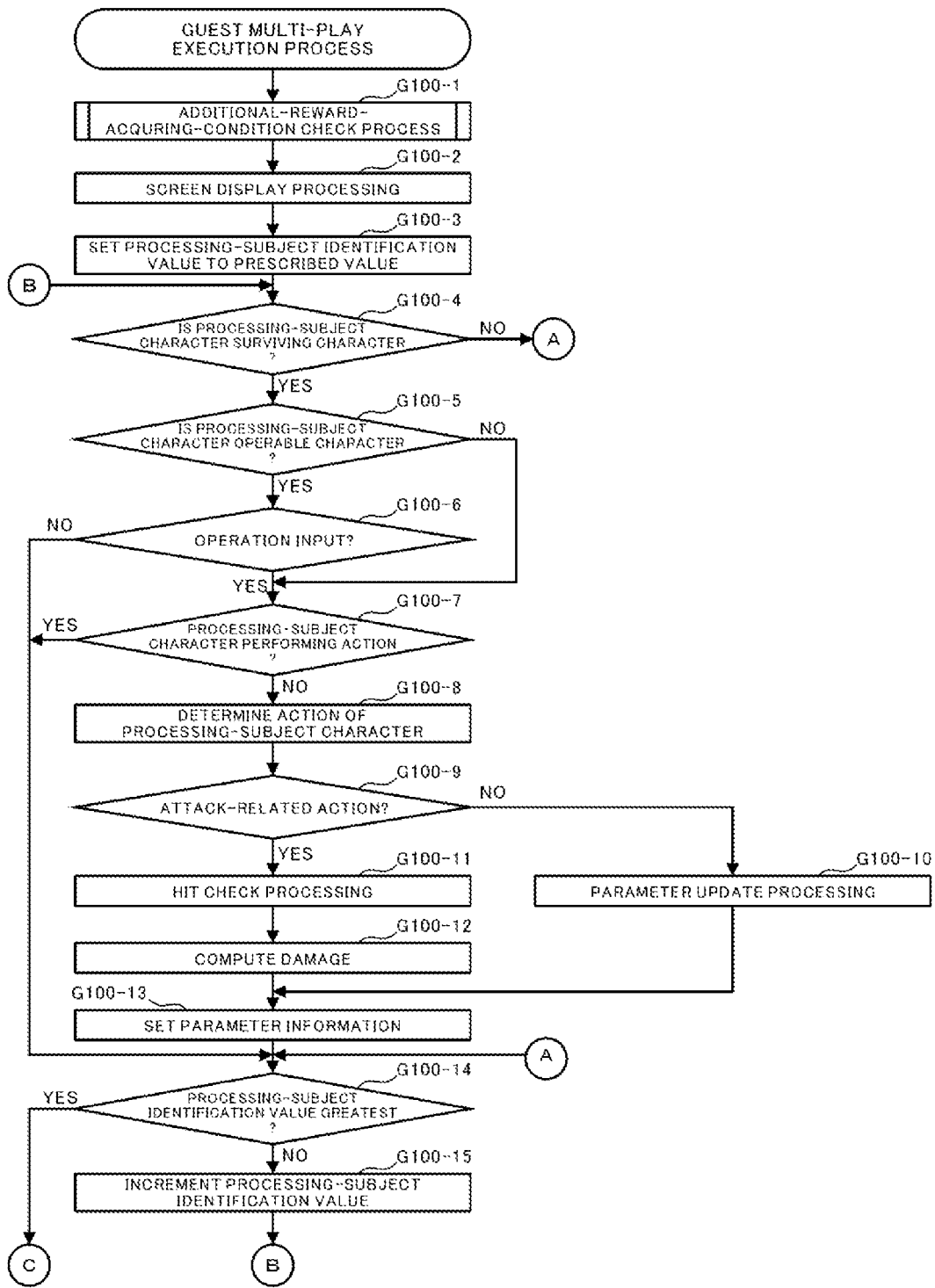
FIG. 23 is a first flowchart for explaining a guest multi-play execution process at a guest terminal.
Figure 24:
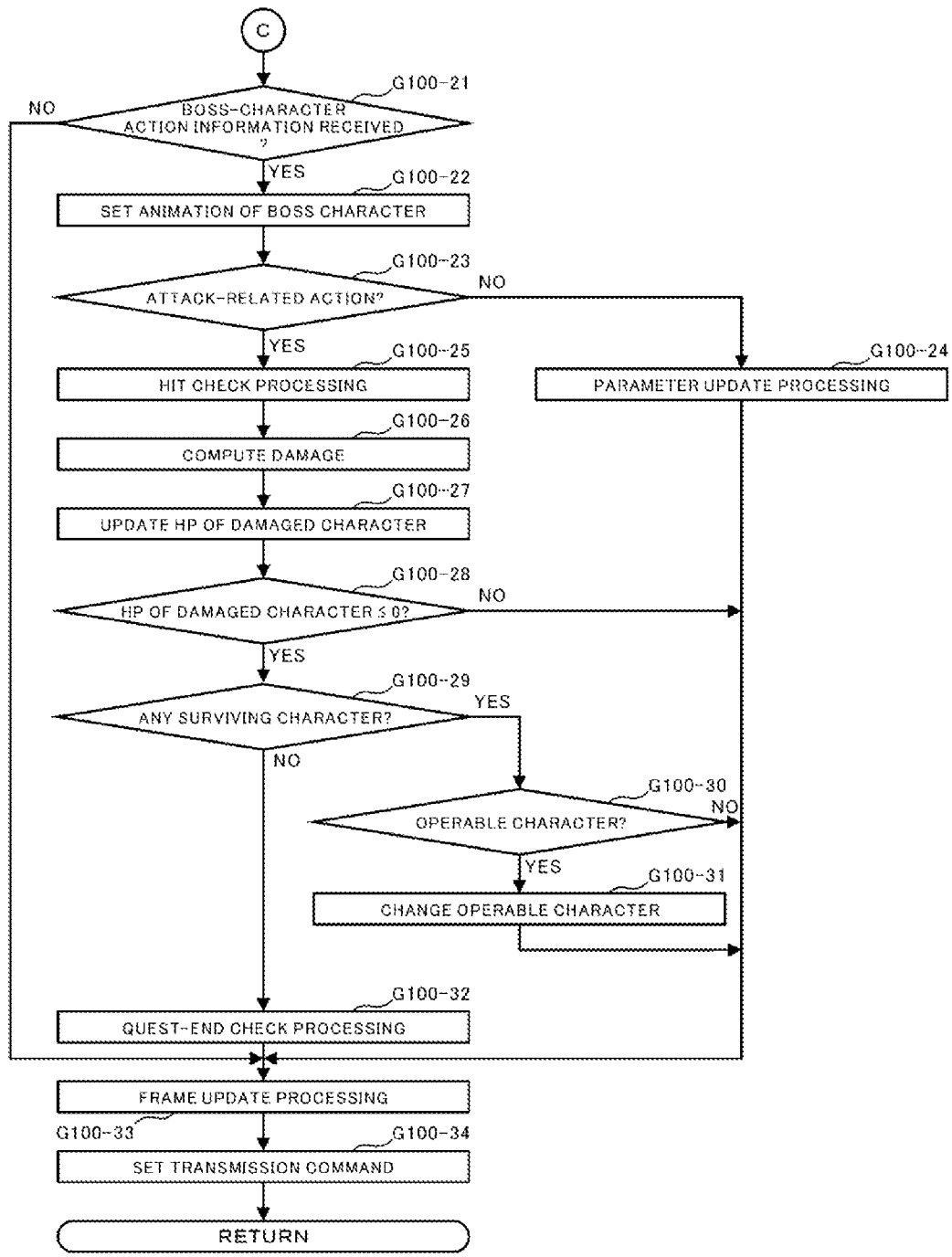
FIG. 24 is a second flowchart for explaining the guest multi-play execution process at the guest terminal.

FIG. 23 is a first flowchart for explaining the guest multi-play execution process at a guest terminal. FIG. 24 is a second flowchart for explaining the guest multi-play execution process at the guest terminal. The guest multi-play execution process described below is executed repeatedly for individual frames (at image update intervals) of the guest terminal until multi-play is finished.

First, the condition check unit 70 executes an additional-reward-acquiring-condition check process (G100-1). The additional-reward-acquiring-condition check process that is executed here is the same as the additional-reward-acquiring-condition check process described with reference to FIG. 21. Alternatively, the additional-reward-acquiring-condition check process that is executed in G100-1 may be different from the additional-reward-acquiring-condition check process described with reference to FIG. 21. For example, the additional-reward-acquiring-condition check process that is executed in G100-1 may be a simplified additional-reward-acquiring-condition check process in which the processing for checking whether or not the number of assignments of additional rewards to the player himself or herself is less than the upper limit of the number of assignments (H60-5), described with reference to FIG. 21, is omitted. Alternatively, the additional-reward-acquiring-condition check process that is executed in G100-1 may be executed only at the time of quest end processing (G100-32), which will be described later, instead of being executed every frame. Note that when a guest player has exit from (leaves) the room after a battle game is started, the participating character and player information of the player who has exited is deleted from the room information.

Here, in the case where the communication connection with a guest terminal is kept disconnected for a prescribed period or longer (YES in S100-6 in FIG. 22), the server 100 considers that the guest player corresponding to the guest terminal experiencing the communication disconnection has exited from (left) the room, and performs processing for deleting the player information corresponding to the guest player from the room information. Alternatively, in the case where a guest player has operated a retire operation button after the battle game is started, the server 100 considers that the guest player has exited from (left) the room, and performs processing for deleting the player information corresponding to the guest player from the room information. Therefore, for example, even in the case where the HP of the participating character of a guest player has become less than or equal to zero, whereby the participating character has become unable to battle, the guest player is maintained in the state present in the room as long as the room exists, the guest player experiences a communication disconnection for a prescribed period or longer or operates the retire operation button.

Note that in the case where the communication with the host terminal is kept disconnected for the prescribed period or longer or in the case where the host player has operated the retire operation button, the server 100 executes the solo-play switch processing (S100-8 in FIG. 22) to break up the room. When the room has been broken up, the room information is deleted. In the case where the room information has been deleted, the player information of the guest players (the other players) also becomes absent. Thus, the condition check unit 70 determines that the additional-reward acquiring condition is not satisfied (H60-4 in FIG. 21), and the report unit 72 executes screen display processing for superimposing a notifying part 54g (see FIG. 11C), the notifying part 54g indicating that the additional-reward acquiring condition is not satisfied to each player for whom the additional-reward acquiring condition has been satisfied (i.e., each advanced player). The following describes the additional-reward-acquiring-condition check process in the case where a guest player has exited from (left) the room, referring back to FIG. 21.

The condition check unit 70 obtains the room information from which the player information of the player who has exited has been deleted (H60-1). Here, for example, if the player who has exited corresponds to a novice player, the condition check unit 70 obtains room information from which the player information of the novice player who has exited has been deleted.

The condition check unit 70 checks whether or not the player himself or herself (a guest player here) has cleared the quest selected by the host player (i.e., the specific battle game that was set when the room was created) (H60-2).

If the player himself or herself has cleared the quest (YES in H60-2), it is checked whether or not the other players in the room have cleared the quest selected by the host player (H60-3). Meanwhile, if the player himself or herself has not cleared the quest (NO in H60-2), it is determined that the additional-reward acquiring condition is not satisfied (a condition non-satisfaction determination) (H60-4), and the additional-reward-acquiring-condition check process is finished.

If there is any player who has not cleared the quest among the other players in the room (NO in H60-3), it is checked on the basis of the player information of the player himself or herself whether or not the number of assignments is less than the upper limit of the number of assignments (H60-5). Meanwhile, if there is no player who has not cleared the quest among the other players in the room (YES in H60-3), the process proceeds to H60-4, and the additional-reward-acquiring-condition check process is finished. That is, after the start of a battle game, when novice players have exited from (left) a room, so that there is no longer any item of player information corresponding to a novice player in the room information, the condition check unit 70 determines that the additional-reward acquiring condition is not satisfied (a condition non-satisfaction determination).

If the number of assignments is less than the upper limit of the number of assignments (YES in H60-5), it is determined that the additional-reward acquiring condition is satisfied (a condition satisfaction determination) (H60-6), and the additional-reward-acquiring-condition check process is finished. Meanwhile, if the number of assignments is not less than the upper limit of the number of assignments (NO in H60-5), the process proceeds to H60-4, and the additional-reward-acquiring-condition check process is finished.

Referring back to FIG. 23, in the case where it is determined that the additional-reward acquiring condition is satisfied, the report unit 72 executes screen display processing for superimposing a notifying part 54*g* indicating that the additional-reward acquiring condition is satisfied (see FIGS. 11A and 11B) on the quest start screen or the battle screen. In the case where the additional-reward acquiring condition has become no longer satisfied after the additional-reward acquiring condition is satisfied, the report unit 72 executes screen display processing for superimposing a notifying part 54*g* indicating that the additional-reward acquiring condition is not satisfied (see FIG. 11C) (G100-2). Note that the report unit 72 need not display the notifying part 54*g* every frame; for example, the report unit 72 may display the notifying part 54*g* once at the timing when the additional-reward acquiring condition has become no longer satisfied or when the battle game is finished.

The quest execution unit 66 sets the processing-subject identification value to a prescribed value (00H here) (G100-3). The quest execution unit 66 checks whether or not the processing-subject character (the participating character corresponding to the processing-subject identification value) is a surviving character (G100-4). In the case where the processing-subject character is not surviving (NO in G100-4), it is checked whether or not the processing-subject identification value is the greatest (G100-14). If the processing-subject identification value is the greatest (YES in G100-14), i.e., if the processing for all the participating characters corresponding to the player is finished, the process proceeds to G100-21, which will be described later. If the processing-subject identification value is not the greatest (NO in G100-14), i.e., if the processing for all the participating characters corresponding to the player is not finished, the processing-subject identification value is incremented (G100-15), and the process is repeated from G100-4.

If the processing-subject character is surviving (YES in G100-4), it is checked whether or not the processing-subject character is an operable character (G100-5). If the processing-subject character is an operable character (YES in G100-5), it is checked whether or not an operation has been input at the player terminal 1 (G100-6). If no operation has been input (NO in G100-6), the process proceeds to G100-14. Meanwhile, in the case where the processing-subject character is an operable character and an operation has been input (YES in G100-6) and in the case where the processing-subject character is a non-operated character (NO in G100-5), it is checked whether or not the processing-subject character is performing an action (G100-7). If the processing-subject character is performing an action (YES in G100-7), the process proceeds to G100-14.

Meanwhile, if the processing-subject character is not performing an action (NO in G100-7), the quest execution unit 66 determines an action of the processing-subject character (G100-8). The quest execution unit 66 determines whether or not the determined action is an attack-related action (G100-9). If the determined action is not an attack-related action (NO in G100-9), various kinds of parameters are updated as needed (G100-10), and the process proceeds to G100-13. In the case where an attack-related action is determined (YES in G100-9), the quest execution unit 66 executes hit check processing (G100-11), and computes the damage that is given to the boss character (G100-12). Furthermore, the quest execution unit 66 sets the computed given damage information, other parameter information, etc. and transmits these items of information to the server 100 (G100-13).

When the processing for all the participating characters corresponding to the player is finished (YES in G100-14), as shown in FIG. 24, the quest execution unit 66 checks whether action information indicating an action of the boss character has been received (G100-21). If boss-character action information has not been received, the frame of the display 26 is updated (G100-33), a transmission command for transmission to the server 100 is set (G100-34), and the guest multi-play execution process is finished. Here, as described earlier, the guest multi-play execution process is executed repeatedly for individual frames of the guest terminal. In the guest multi-play execution process, the battle game via multi-play is finished in the case where quest end information is transmitted through quest end processing (G100-32), which will be described later, and the guest multi-play execution process is executed repeatedly in the case where quest end information is not transmitted through the quest end processing.

Upon receiving boss-character action information (YES in G100-21), an animation of the boss character is set (G100-22). The quest execution unit 66 checks whether or not the action of the boss character is an attack-related action (G100-23). If the action of the boss character is not an attack-related action (NO in G100-23), various kinds of parameters are updated as needed (G100-24), and the process proceeds to G100-33. If the action of the boss character is an attack-related action (YES in G100-23), the quest execution unit 66 executes hit check processing (G100-25), computes the damage given to the participating character corresponding to the player (G100-26), and updates the HP of the damaged character by subtracting the computed damage from the HP of the damaged character (G100-27).

The quest execution unit 66 checks whether or not the HP of the damaged character (participating character) is less than or equal to zero (G100-28). If the HP of the damaged character is not less than or equal to zero (NO in G100-28), the process proceeds to G100-33. Meanwhile, if the HP of the damaged character is less than or equal to zero (YES in G100-28), it is checked whether or not there is any surviving character among the participating characters (G100-29). In the case where there is no surviving character (NO in G100-29), quest-end check processing is executed to check whether or not all the participating characters of the plurality of players (team) participating in the battle game have been annihilated (G100-32). In the case where it is determined that all the participating characters have been annihilated, the quest execution unit 66 executes quest end processing for finishing the quest. In the quest end processing, quest end information indicating the end of the quest is set. Meanwhile, in the case where all the participating characters have not been annihilated, the quest execution unit 66 does not execute the quest end processing, and the process proceeds to G100-33.

Meanwhile, in the case where there is any surviving character (YES in G100-29), it is checked whether or not the damaged character whose HP has become less than or equal to zero is an operable character (G100-30). In the case where the HP of the operable character is less than or equal to zero (YES in G100-30), the operable character is changed (G100-31), and the process proceeds to G100-33. In the case where the HP of the operable character is not less than or equal to zero, the process proceeds to G100-33.

Figure 25:
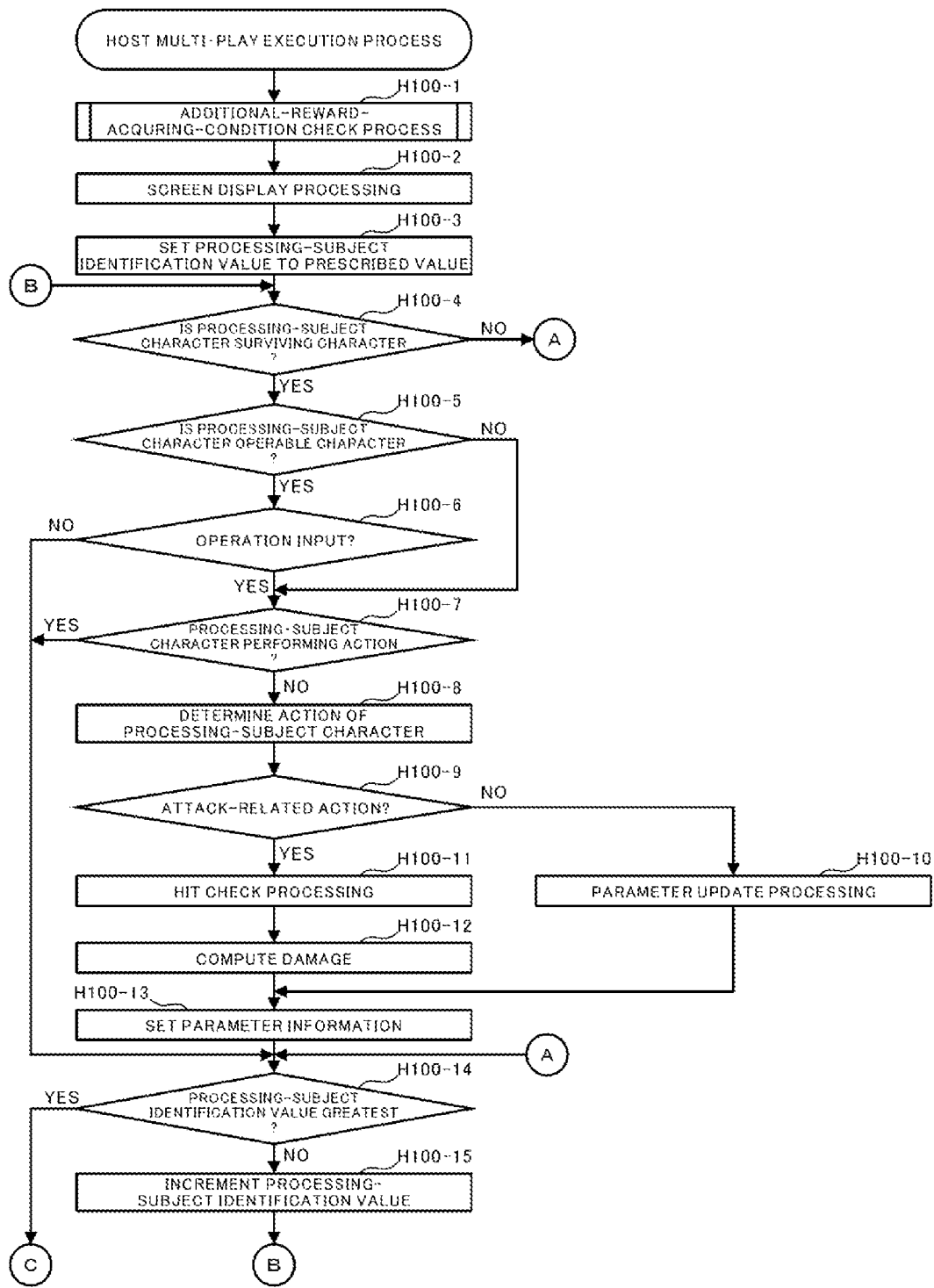
FIG. 25 is a first flowchart for explaining a host multi-play execution process at the host terminal.
Figure 26:
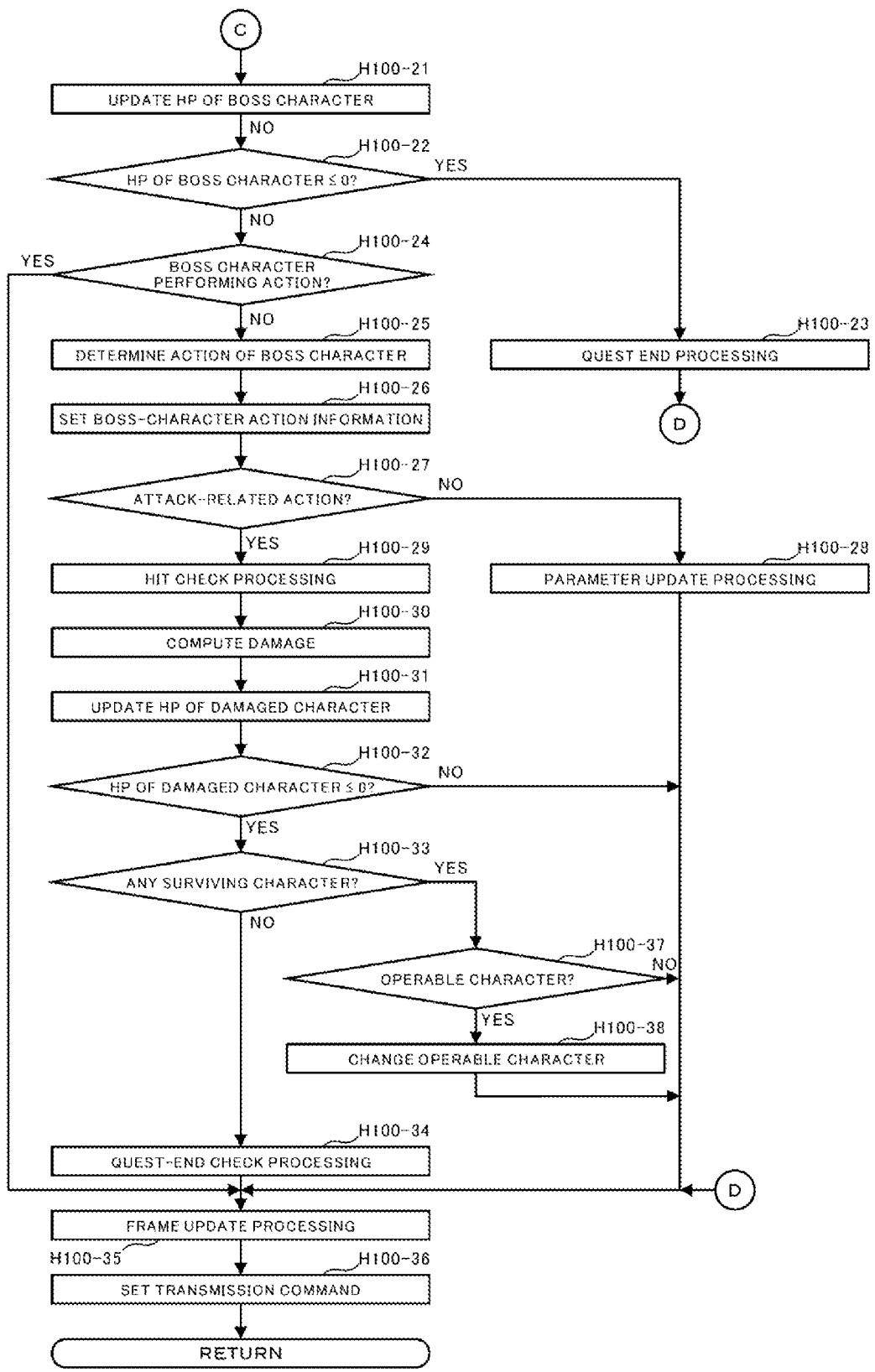
FIG. 26 is a second flowchart for explaining the host multi-play execution process at the host terminal.

FIG. 25 is a first flowchart for explaining the host multi-play execution process at the host terminal. FIG. 26 is a second flowchart for explaining the host multi-play execution process at the host terminal. The host multi-play execution process described below is executed repeatedly for individual frames (at image update intervals) of the host terminal until multi-play is finished.

The quest execution unit 66 executes processing in H100-1 to H100-15 shown in FIG. 25. These processing steps relate to the participating characters corresponding to the host player, and are the same as the processing steps G100-1 to G100-15 in the guest multi-play execution process. When the processing is finished for all the participating players corresponding to the host player (YES in H100-14), as shown in FIG. 26, the quest execution unit 66 updates the HP of the boss character (H100-21).

Here, subtraction from the HP of the boss character is performed on the basis of given damage information received from the server 100. That is, in this embodiment, the value of given damage that is given to the boss character and the value of damage given by the boss character are computed at each player terminal 1. Of these values, processing for performing subtraction from the HP of a participating character as a result of damage given by the boss character is performed at each player terminal 1. Meanwhile, the HP of the boss character is managed at the host terminal. Here, the HP of the boss character is updated on the basis of given damage information from the server 100, i.e., from the other guest terminals.

The quest execution unit 66 checks whether or not the HP of the boss character is less than or equal to zero (H100-22). When the HP of the boss character has become less than or equal to zero (YES in H100-22), the quest execution unit 66 executes quest end processing (H100-23).

If the HP of the boss character is not less than or equal to zero (NO in H100-22), the quest execution unit 66 checks whether or not the boss character is performing an action (H100-24). If the boss character is performing an action (YES in H100-24), the frame of the display 26 is updated (H100-35), a transmission command for transmission to the server 100 is set (H100-36), and the host multi-play execution process is finished. Here, as described earlier, the host multi-play execution process is executed repeatedly for individual frames of the host terminal. In the host multi-play execution process, the battle game via multi-play is finished in the case where quest end information is transmitted through quest end processing (H100-23 and H100-34), which will be described later, and the host multi-play execution process is executed repeatedly in the case where quest end information is not transmitted through the quest end processing.

Meanwhile, if the boss character is not performing an action (NO in H100-24), an action of the boss character is determined on the basis of a prescribed action program for the boss character (H100-25), and boss-character action information is set (H100-26). The boss-character action information set here is transmitted to the server 100 by the transmission and reception unit 60, and is transmitted to each guest terminal via the server 100.

Furthermore, the quest execution unit 66 checks whether or not the determined action of the boss character is an attack-related action (H100-27). If the determined action is not an attack-related action (NO in H100-27), various kinds of parameters are updated as needed (H100-28), and the process proceeds to H100-35. If an attack-related action is determined (YES in H100-27), the quest execution unit 66 performs hit check processing for determining whether the attack has hit a participating character corresponding to the host player (H100-29), computes the damage that is given to participating character (H100-30), and updates the HP of the damaged character by subtracting the computed damage from the HP of the damaged character (H100-31).

The quest execution unit 66 checks whether or not the HP of the damaged character (participating character) is less than or equal to zero (H100-32). If the HP of the damaged character is not less than or equal to zero (NO in H100-32), the process proceeds to H100-35. Meanwhile, if the HP of the damaged character is less than or equal to zero (YES in H100-32), it is checked whether or not there is any surviving character among the participating characters (H100-33). In the case where there is no surviving character (NO in H100-33), quest-end check processing is performed to check whether or not all the participating characters of the plurality of players (team) participating in the battle game have been annihilated (H100-34). In the case where it is determined that all the participating characters have been annihilated, the quest execution unit 66 performs quest end processing for finishing the quest. In the quest end processing, quest end information indicating the end of the quest is set. Meanwhile, in the case where all the participating characters have not been annihilated, the quest execution unit 66 does not execute the quest end processing, and the process proceeds to H100-35.

Meanwhile, in the case where there is any surviving character (YES in H100-33), it is checked whether or not the damaged character whose HP has become less than or equal to zero is an operable character (H100-37). In the case where the HP of the operable character is less than or equal to zero (YES in H100-37), the operable character is changed (H100-38), and the process proceeds to H100-35. In the case where the HP of the operable character is not less than or equal to zero, the process proceeds to H100-35. Note that the quest-end check processing (H100-34) that is executed at the host terminal is the same as the quest-end check processing (G100-32) that is executed at a guest terminal.

As described above, a battle game via multi-play is realized by concurrently performing the synchronization process (S100), the guest multi-play execution process (G100), and the host multi-play execution process (H100) at the server 100, the guest terminals, and the host terminal, respectively.

Referring back to FIG. 19, when the battle game via multi-play is finished, at the server 100, the reward determination unit 182 executes an additional-reward-acquiring-condition check process and a reward lottery process (S31) on the basis of the quest end information. The reward determination unit 182 determines a base reward by using the base reward lottery table (see FIG. 8A), and determines a number-of-continuations reward by using the number-of-continuations reward lottery table (FIG. 8B) on the basis of information indicating the number of continuations permitted, transmitted when the quest is finished.

The additional-reward-acquiring-condition check process that is executed in S31 is the same as the additional-reward-acquiring-condition check process described with reference to FIG. 21, and thus a description thereof will be omitted. In the case where there is any player satisfying the additional-reward acquiring condition, the reward determination unit 182 determines additional rewards for that player. Note that the quest end information may include information as to whether or not the additional-reward acquiring condition is satisfied, as determined at each player terminal 1 when the quest was cleared. In this case, the reward determination unit 182 may determine additional rewards for each player on the basis of whether or not the additional-reward acquiring condition is satisfied, obtained from each player terminal 1. Note that in the case where information as to whether or not the additional-reward acquiring condition is satisfied is obtained from each player terminal 1, the reward determination unit 182 need not execute the additional-reward-acquiring-condition check process described above.

The reward assignment unit 184 assigns the rewards (additional rewards) determined by the reward determination unit 182 to the players. Then, the player-information storage unit 180 updates the player information at the server 100 in order to update quest clearing information, information concerning the number of assignments of additional rewards, etc. (S32). At each of the host terminal and the guest terminals, reward-screen display processing for displaying the reward screen (see FIG. 6B) is executed on the basis of reward information received from the server 100 (H33 and G32), and the quest is finished (H34 and G33).

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

The above-described embodiment has been described in the context of the case where when the room searching button 52b has been tapped at a guest terminal, entry request information is transmitted to the server 100 (G11), and processing in which the server 100 identifies a room (S12) is executed. Without limitation thereto, however, when the room searching button 52b has been tapped, the guest terminal may obtain a plurality of items of room information from the server 100 and may display a list of the plurality of items of room information on the display 26. In this case, the guest player may manually select a room to participate in from the list of items of room information displayed on the display 26, and the server 100 may perform processing for letting the guest player enter the selected room. At this time, the room information received from the server 100 may include information as to whether or not the room includes a novice player, and the guest terminal may display the information as to whether or not the room includes a novice player on the display 26 to notify the guest player.

The above-described embodiment has been described in the context of the case where when the room searching button 52b has been tapped at a guest terminal, entry request information is transmitted to the server 100 (G11), and processing in which the server 100 identifies a room (S12) is executed. Here, the server 100 may check whether or not the guest player corresponds to an advanced player on the basis of the entry request information of the guest player (the type of quest selected by the guest player, as well as the player information). In the case where the guest player corresponds to an advanced player, the server 100 may identify a room including a novice player and may perform adjustment so as to preferentially match the guest player (advanced player) with the room including the novice player. Alternatively, the player terminal 1 of the guest player may be configured such that, in the case where the guest player corresponds to an advanced player, as an option for room searching, the guest player is matched only with a room including a novice player. Similarly, the player terminal 1 of the host player may be configured such that, in the case where the host player corresponds to an advanced player, as an option for room creation, at least one novice player will be matched (will enter the room).

The above-described embodiment has been described in the context of an example where, in multi-play, in the case where ready information of all the guest players have been transmitted from the guest terminals and all the players have entered the ready state (FIG. 9B), a notifying part 54g including condition satisfaction information is displayed (FIG. 10A). However, in multi-play, the host player can start a quest even before the transmission of the ready information of all the guest players if at least one guest player has entered the room. Alternatively, in multi-play, the host player can start a quest even before the transmission of the ready information of all the guest players if the ready information has been transmitted from the guest terminal of at least one guest player. In this case, although a notifying part 54g such as the one shown in FIG. 10A is not displayed in the quest wait screen of each advanced player, in the case where it is determined that the additional-reward acquiring condition is satisfied after the start of the quest, a notifying part 54g is displayed in the quest start screen (FIG. 11A) or the battle game screen (FIG. 11B), and additional rewards can be acquired when the battle game has been cleared.

In the above-described embodiment, the assignment of processes that are executed at the player terminal 1 and the server 100 is merely an example. For example, although hit checking, computation of damage values, etc. are executed at the player terminal 1 in the above-described embodiment, these kinds of processing may be executed at the server 100. In either case, it suffices for each of the above-described processes to be executed by at least either of the player terminal 1 and the server 100, and there is no particular limitation to the timings of execution of the processes and the devices that execute the processes.

In the above-described embodiment, a participating character enters the continuation disabled state, in which actions are disabled, when the HP thereof has become less than or equal to zero, and enters the continuation enabled state, in which actions are enabled, in the case where the HP thereof is greater than or equal to zero. However, conditions for determining the continuation enabled state and the continuation disabled state are not limited thereto. For example, the game may be designed such that a prescribed life value is set to each participating character and such that the life value decreases when the participating character is attacked by an enemy character, and the continuation disabled state may be assumed in the case where the life value has become zero.

In any case, it suffices that a participating character (participating object) in the continuation enabled state is caused to take actions on the basis of operations input to the player terminal 1 during the game or on the basis of computer control and that a participating character (participating object) in the continuation disabled state is disabled to take actions, and there is no particular limitation to the game design.

Furthermore, although a capacity defining the upper limit of the number of participating characters (participating objects) that can be registered is provided in multi-play in the above-described embodiment, the capacity need not be set. Furthermore, in the above-described embodiment, a number of non-operated characters (non-operated objects) corresponding to the difference between the capacity and the number of registered operable characters (operable objects) are registered as participating characters (participating objects). However, non-operated characters may be set irrespective of the above difference, for example, within a prescribed number serving as an upper limit, or the player may be allowed to select whether or not to register non-operated characters or the number of non-operated characters to be registered.

Furthermore, although the above-described embodiment has been described in the context of the case where solo-play is possible, solo-play is not necessary.

Note that the information processing programs for executing processing in the embodiment described above may be stored in a computer-readable storage medium and may be provided in the form of the storage medium. Alternatively, a game terminal device including the storage medium may be provided. Alternatively, the embodiment described above may be embodied in the form of an information processing method for realizing the individual functions and the steps shown in the flowcharts.

What is claimed is:

1. A non-transitory computer readable medium storing a program causing a computer to execute a method comprising:
    forming a team constituted of a plurality of players who try a specific battle game;
    determining a portion of the plurality of players who have cleared the specific battle game based on player information of the plurality of players;
    determining whether a reward acquiring condition is satisfied, the reward acquiring condition being satisfied in response to determining that the team comprises a first player and a second player, the first player being a player who has cleared the specific battle game, and the second player being a player who has not cleared the specific battle game; and
    assigning a reward to the first player in response to determining that the reward acquiring condition is satisfied and the specific battle game has been cleared by the team,
    wherein determining whether the reward acquiring condition is satisfied comprises:
        determining whether a number of assignments of the reward to the first player during a certain period being less than an upper limit of the number of assignments in response to the team comprising the first player and the second player;
        determining that the reward acquiring condition is satisfied in response to the number of assignments being less than the upper limit of the number of assignments; and
        determining that the reward acquiring condition is not satisfied in response to the number of assignments being not less than the upper limit of the number of assignments.

2. The non-transitory computer readable medium according to claim 1, wherein the program causing the computer to execute:
    reporting condition satisfaction information to the first player before a start of the specific battle game, the condition satisfaction information indicating that the reward acquiring condition is satisfied.

3. The non-transitory computer readable medium according to claim 2, wherein:
    determining whether the reward acquiring condition is satisfied is executed when ready operations for the specific battle game have been performed by individual players among the plurality of players and ready information has been received from the individual players, whereby all of the plurality of the players in the team have entered a ready state; and
    reporting the condition satisfaction information includes reporting the condition satisfaction information only to the first player.

4. The non-transitory computer readable medium according to claim 2, wherein:
    determining whether the reward acquiring condition is satisfied includes determining that the reward acquiring condition is not satisfied when the second player has left the team during the specific battle game; and
    the program causing the computer to execute:
    reporting condition non-satisfaction information to the first player, the condition non-satisfaction information indicating that the reward acquiring condition is no longer satisfied.

5. The non-transitory computer readable medium according to claim 1, wherein:
    determining whether the reward acquiring condition is satisfied is executed when the specific battle game has been cleared; and
    the reward is not assigned to the first player in response to the reward acquiring condition being not satisfied when the specific battle game has been cleared.

6. An information processing method that is executed by one or both of a game terminal and a server that is capable of carrying out communication with the game terminal, the information processing method comprising:
    forming a team constituted of a plurality of players who try a specific battle game;
    determining a portion of the plurality of players who have cleared the specific battle game based on player information of the plurality of players;
    determining whether a reward acquiring condition is satisfied, the reward acquiring condition being satisfied in response to determining that the team comprises a first player and a second player, the first player being a player who has cleared the specific battle game, and the second player being a player who has not cleared the specific battle game; and assigning a reward to the first player in response to determining that the reward acquiring condition is satisfied and the specific battle game has been cleared by the team, wherein determining whether the reward acquiring condition is satisfied comprises:

determining whether a number of assignments of the reward to the first player during a certain period being less than an upper limit of the number of assignments in response to the team comprising the first player and the second player;

determining that the reward acquiring condition is satisfied in response to the number of assignments being less than the upper limit of the number of assignments; and determining that the reward acquiring condition is not satisfied in response to the number of assignments being not less than the upper limit of the number of assignments.

7. An information processing system including a game terminal and a server that is capable of carrying out communication with the game terminal, one or both of the game terminal and the server is configured to execute a method comprising:

forming a team constituted of a plurality of players who try a specific battle game;

determining a portion of the plurality of players who have cleared the specific battle game based on player information of the plurality of players;

determining whether a reward acquiring condition is satisfied, the reward acquiring condition being satisfied in response to determining that the team comprises a first player and a second player, the first player being a player who has cleared the specific battle game, and the second player being a player who has not cleared the specific battle game; and assigning a reward to the first player in response to determining that the reward acquiring condition is satisfied and the specific battle game has been cleared by the team, wherein determining whether the reward acquiring condition is satisfied comprises:

determining whether a number of assignments of the reward to the first player during a certain period being less than an upper limit of the number of assignments in response to the team comprising the first player and the second player;

determining that the reward acquiring condition is satisfied in response to the number of assignments being less than the upper limit of the number of assignments; and determining that the reward acquiring condition is not satisfied in response to the number of assignments being not less than the upper limit of the number of assignments.

\* \* \* \* \*